United States Patent
Shiiyama et al.

(10) Patent No.: US 9,582,518 B2
(45) Date of Patent: Feb. 28, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hirotaka Shiiyama, Yokohama (JP); Masahiro Matsushita, Yokohama (JP); Hideki Sorakado, Asaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/744,413

(22) Filed: Jun. 19, 2015

(65) Prior Publication Data

US 2015/0379368 A1    Dec. 31, 2015

(30) Foreign Application Priority Data

Jun. 30, 2014  (JP) .................................. 2014-135165

(51) Int. Cl.
  *G06F 17/30*  (2006.01)
  *G06K 9/62*  (2006.01)

(52) U.S. Cl.
  CPC .. *G06F 17/30253* (2013.01); *G06F 17/30047* (2013.01); *G06K 9/6211* (2013.01); *G06K 9/6215* (2013.01)

(58) Field of Classification Search
  CPC .. G06K 9/6211; G06K 9/4671; G06K 9/6215; G06K 9/6228; G06K 9/6272;
  (Continued)

(56) References Cited

U.S. PATENT DOCUMENTS

2008/0310589 A1* 12/2008 Schmiegel ........... G01V 5/0016
378/57
2009/0141984 A1* 6/2009 Nakamura ........... G06K 9/6228
382/201
(Continued)

FOREIGN PATENT DOCUMENTS

JP    2009-284084 A    12/2009

OTHER PUBLICATIONS

Harris et al., "A combined corner and edge detector", in Alvey Vision Conference, pp. 147-151, 1988.
(Continued)

*Primary Examiner* — Jingge Wu
(74) *Attorney, Agent, or Firm* — Carter DeLuca, Farrell & Schmidt, LLP

(57) ABSTRACT

There is provided with an image processing apparatus. An evaluation is set for each of the pairs. The evaluation is set based on at least one of the number of feature points in the first image where local feature amounts are similar to a local feature amount at one of the pair or the number of feature points in the second image where local feature amounts are similar to a local feature amount at one of the pair, in such a manner that the smaller the number of feature points, the higher the evaluation. A similarity between the first image and the second image is determined using a RANSAC method. A pair having a high evaluation is used with priority in derivation of a function for transforming coordinates using the RANSAC method.

18 Claims, 17 Drawing Sheets

(58) Field of Classification Search
CPC ............ G06K 9/4604; G06F 17/30256; G06F 17/30047; G06F 17/30247; G06F 17/30253
See application file for complete search history.

(56) References Cited

U.S. PATENT DOCUMENTS

| | | | | |
|---|---|---|---|---|
| 2011/0150324 | A1* | 6/2011 | Ngan | G06K 9/00704 382/159 |
| 2011/0299770 | A1* | 12/2011 | Vaddadi | G06K 9/6211 382/165 |
| 2012/0221572 | A1* | 8/2012 | Wang | G06F 17/30256 707/737 |
| 2012/0263385 | A1* | 10/2012 | van Zwol | G06K 9/6202 382/201 |
| 2013/0011069 | A1* | 1/2013 | Quan | G06K 9/00704 382/190 |
| 2013/0121587 | A1* | 5/2013 | Brandt | G06K 9/6272 382/195 |
| 2013/0132402 | A1* | 5/2013 | Yang | G06F 17/30256 707/748 |
| 2013/0254191 | A1* | 9/2013 | He | G06F 17/3053 707/728 |
| 2013/0322758 | A1* | 12/2013 | Matsushita | G06K 9/18 382/182 |
| 2014/0254940 | A1* | 9/2014 | Shiiyama | G06K 9/4671 382/201 |
| 2014/0314324 | A1* | 10/2014 | Tian | G06F 17/30247 382/197 |

OTHER PUBLICATIONS

Lowe, "Distinctive Image Features from Scale-Invariant Keypoints," International Journal of Computer Vision, 60, 2, pp. 91-110, 2004.

Fischler, et al., "Random sample consensus: A paradigm for model fitting with applications to image analysis and automated cartography", Graphics and Image Processing, Commun. ACM, vol. 24, No. 6, pp. 381-395, Jun. 1981.

Koenderink, et al., "Representation of local geometry in the visual system," Biological Cybernetics, vol. 55, pp. 367-375, 1987.

* cited by examiner

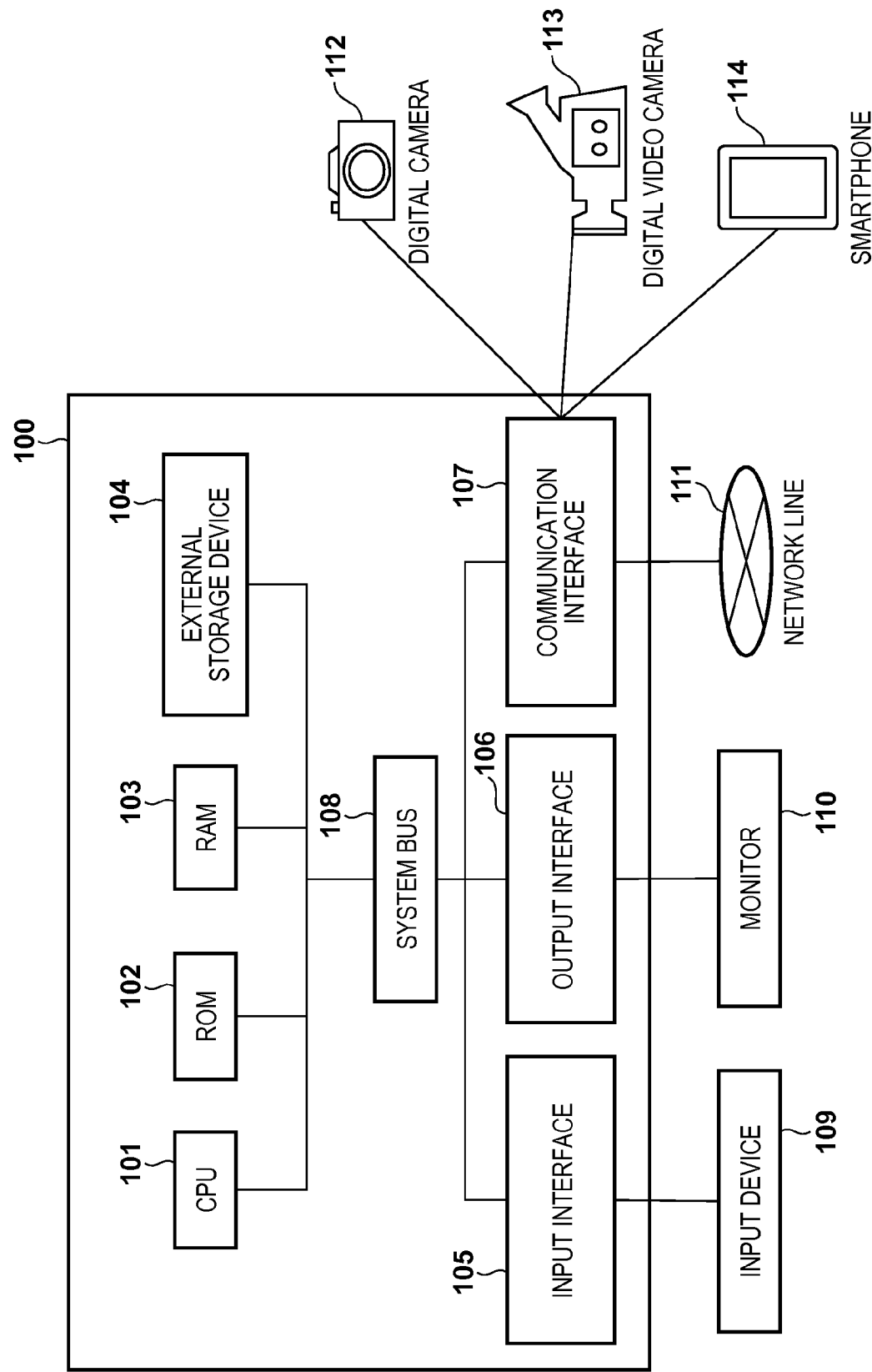

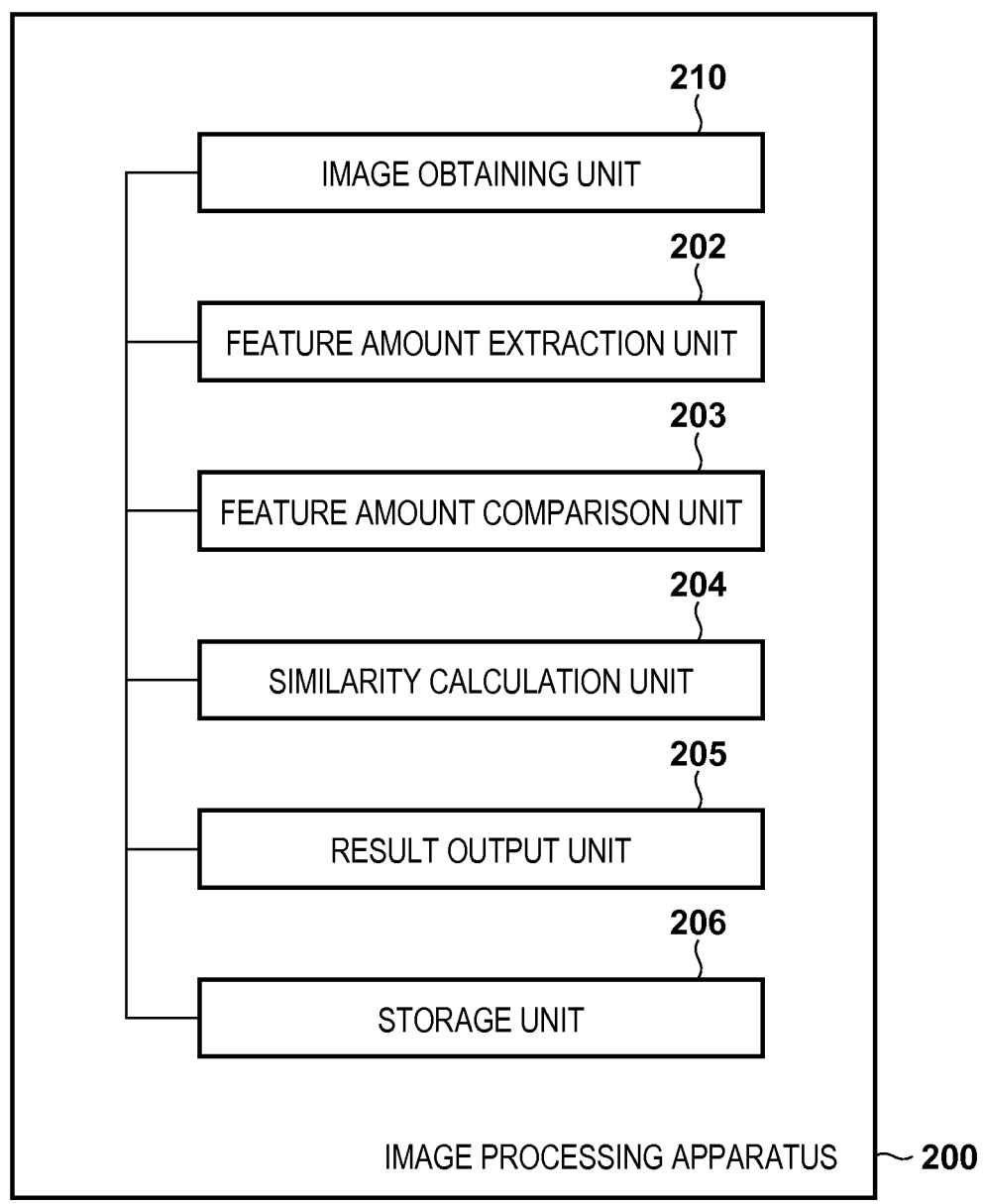

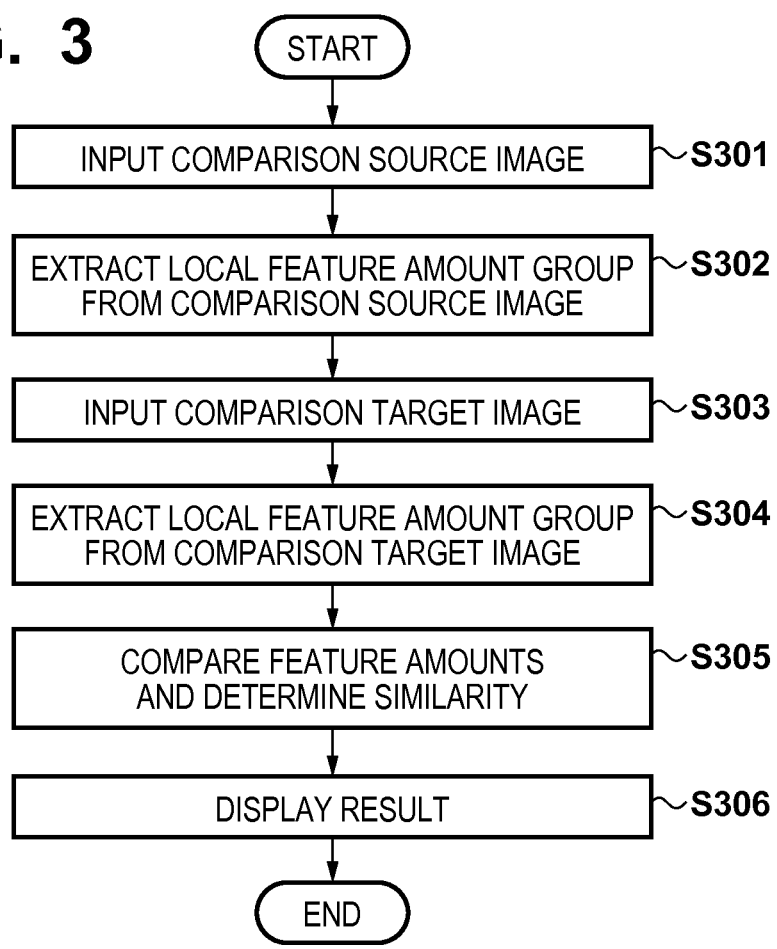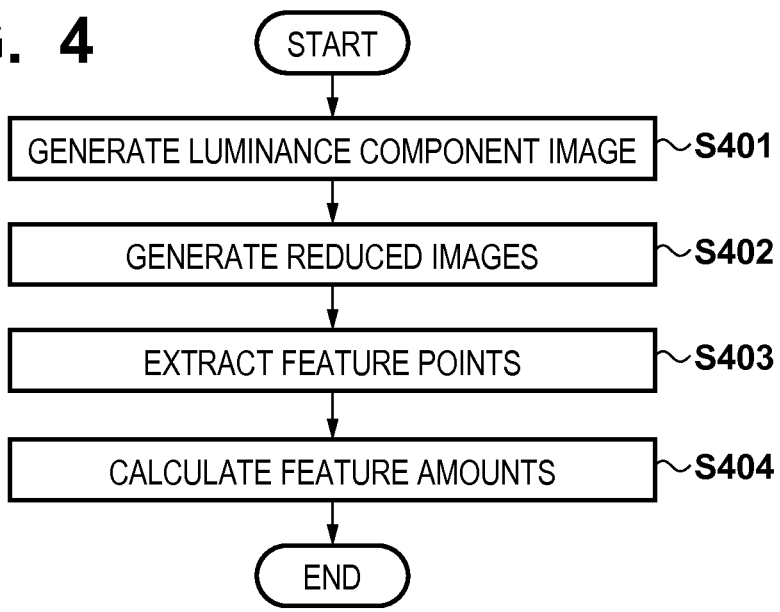

FIG. 7A

| ID | FEATURE AMOUNT IN COMPARISON SOURCE IMAGE | NUMBER OF FEATURE AMOUNTS IN COMPARISON SOURCE IMAGE THAT ARE IN NEIGHBORHOOD OF Vq(k) | FEATURE AMOUNT IN COMPARISON TARGET IMAGE THAT IS NEAREST NEIGHBOR OF FEATURE AMOUNT Vq(k) | NUMBER OF FEATURE AMOUNTS IN COMPARISON TARGET IMAGE THAT ARE IN NEIGHBORHOOD OF Vq(k) | INTER-VECTOR DISTANCE BETWEEN Vq(k) AND Vs(k) | NUMBER OF COMBINATIONS OF NEIGHBOR FEATURE AMOUNTS |
|---|---|---|---|---|---|---|
| k | Vq(k) | Nq(k) | Vs(k) | Ns(k) | DV(k) | Nq(k)*Ns(k) |
| ⋮ | ⋮ | ⋮ | ⋮ | ⋮ | ⋮ | ⋮ |
| m | Vq(m) | Nq(m) | Vs(m) | Ns(m) | DV(m) | Nq(m)*Ns(m) |

FIG. 7B

| FEATURE AMOUNT VECTOR | INFORMATION OF COORDINATES OF FEATURE POINT | ROTATION CORRECTION AMOUNT IN CALCULATION OF FEATURE AMOUNT |
|---|---|---|
| (8,2,15,28,……,20) | (x, y) | r DEGREES |

FIG. 13A
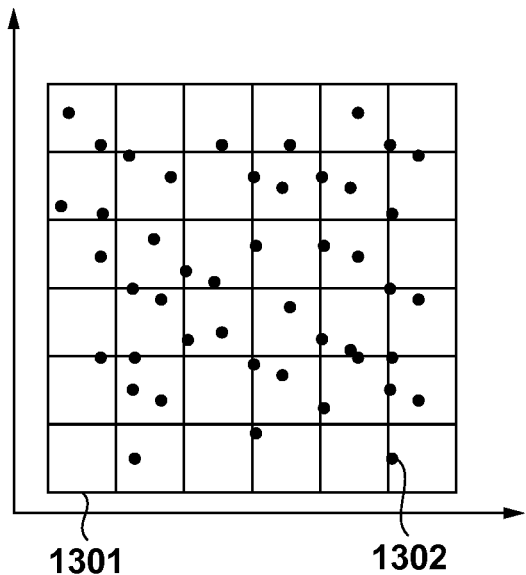
1301    1302
FIG. 13B
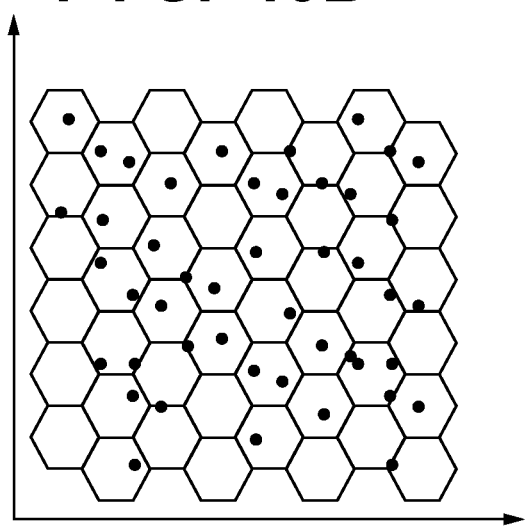
FIG. 14
| IMAGE FEATURE AMOUNT ID | IMAGE FEATURE AMOUNT (FEATURE AMOUNT VECTOR AND INFORMATION OF COORDINATES OF FEATURE POINT) |

| QUANTIZATION LABEL | NUMBER OF IMAGE FEATURE AMOUNTS | IDS OF IMAGE FEATURE AMOUNTS |
|---|---|---|
| 1 | 1 | 1 |
| 3 | 2 | 5, 10 |
| ... | | |
| 12 | 3 | 7, 15, 30 |
| ... | | |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Methods for searching for a similar image using regional feature amounts (local feature amounts) of images have been proposed. Local feature amounts can be calculated in the following manner, for example. First, characteristic points (feature points) are extracted from an image (C. Harris and M. J. Stephens, "A combined corner and edge detector" in Alvey Vision Conference, pages 147-152, 1988). Then, local feature amounts are calculated based on the feature points and image information of regions surrounding the feature points (David G. Lowe, "Distinctive Image Features from Scale-Invariant Keypoints," International Journal of Computer Vision, 60, 2 (2004), pages 91-110). In general, local feature amounts are expressed as vectors. When local feature amounts with rotational invariance or enlargement/reduction invariance are used, a similar image can be found by calculation even if an image is rotated, enlarged, or reduced. For example, Lowe describes calculation of local feature amounts that have rotational invariance by calculating a dominant direction from pixel patterns in local regions surrounding feature points, and performing directional normalization by way of rotation of the local regions on the basis of the dominant direction at the time of calculation of the local feature amounts. Also, local feature amounts that have enlargement/reduction invariance can be calculated by internally generating images of different scales, and extracting feature points and calculating local feature amounts from each of the images of different scales.

Local feature amounts of a plurality of feature points are calculated from one image using various methods. Matching between similar images is performed by comparing local feature amounts calculated for different images. The following describes a case in which an image similar to a search query image is searched for from a group of candidate images. In a voting method described in Japanese Patent Laid-Open No. 2009-284084, a candidate image is voted for when there are feature points having local feature amounts that are similar to local feature amounts of feature points extracted from a search query image. The larger the number of votes, the more the candidate image is determined to be similar to the search query image.

One example of other methods is RANSAC processing described in M. A. Fischler and R. C. Bolles, "Random sample consensus: A paradigm for model fitting with applications to image analysis and automated cartography", Commun. ACM, No. 24, vol. 6, pages 381-395, June 1981. The following describes an example of RANSAC processing. In RANSAC processing, a pair of a feature point in a search query image and a feature point in a candidate image (a feature points pair) is set such that a similarity between local feature amounts of the two feature points is equal to or larger than a threshold. Next, some (e.g., two) feature points pairs are randomly selected from among a plurality of feature points pairs. Furthermore, with reference to the coordinates of the selected feature points pairs (e.g., in the case of two feature points pairs, the coordinates of four feature points), a function, such as an affine transformation, for transforming the coordinates of a feature point in the search query image into the coordinates of a feature point in the candidate image composing the same pair is derived. In one example, a transformation matrix for transforming the coordinates of a feature point in the search query image into the coordinates of a feature point in the candidate image is derived. Then, whether the remaining feature points pairs satisfy the transformation is determined, that is to say, whether transformation of the coordinates of feature points in the search query image yields the coordinates of feature points in the candidate image is determined. If the number of feature points pairs satisfying the transformation is equal to or larger than a preset threshold, it is determined that the search query image matches the candidate image. On the other hand, if the number of feature points pairs satisfying the transformation is smaller than the threshold, some new feature points pairs are randomly selected, and similar processing is repeated. If the number of iterations has reached an upper limit, it is determined that the search query image does not match the candidate image.

SUMMARY OF THE INVENTION

According to an embodiment of the present invention, an image processing apparatus comprises: an obtaining unit configured to obtain a plurality of pairs of a feature point in the first image and a feature point in the second image, wherein the pair of feature points are selected such that local feature amounts of the images at the feature points are similar; a setting unit configured to set an evaluation for each of the pairs, the evaluation being set based on at least one of the number of feature points in the first image where local feature amounts are similar to a local feature amount at one of the pair or the number of feature points in the second image where local feature amounts are similar to a local feature amount at one of the pair, in such a manner that the smaller the number of feature points, the higher the evaluation; and a determination unit configured to determine a similarity between the first image and the second image using a RANSAC method, wherein the determination unit is further configured to use a pair having a high evaluation with priority in derivation of a function for transforming coordinates of a feature point in the second image into coordinates of a corresponding feature point in the first image using the RANSAC method.

According to another embodiment of the present invention, an image processing apparatus comprises: an obtaining unit configured to obtain, a plurality of pairs of a feature point in the first image and a feature point in the second image, wherein the pair of feature points are selected such that local feature amounts of the images at the feature points are similar; a setting unit configured to set an evaluation for each of the pairs, the evaluation being set based on at least one of the number of feature points in the first image where local feature amounts are similar to a local feature amount at one of the pair or the number of feature points in the second image where local feature amounts are similar to a local feature amount at one of the pair, in such a manner that the smaller the number, the higher the evaluation; and a determination unit configured to determine a function having the highest transformation accuracy among derived functions by repeating the following processes, and to determine a similarity between the first image and the second image based on the transformation accuracy of the determined function: deriving a function for transforming coordinates of a feature point in the second image into coordinates of a corresponding feature point in the first image using a selected pair that has been selected from the plurality of pairs based on the evaluation, and determining transformation accuracy of the function for transforming the coordinates of the feature point in the second image into the coordinates of the corresponding feature point in the first image using the plurality of pairs other than the selected pair.

According to still another embodiment of the present invention, an image processing method comprises: obtaining a plurality of pairs of a feature point in the first image and a feature point in the second image, wherein the pair of feature points are selected such that local feature amounts of the images at the feature points are similar; setting an evaluation for each of the pairs, the evaluation being set based on at least one of the number of feature points in the first image where local feature amounts are similar to a local feature amount at one of the pair or the number of feature points in the second image where local feature amounts are similar to a local feature amount at one of the pair, in such a manner that the smaller the number of feature points, the higher the evaluation; and determining a similarity between the first image and the second image using a RANSAC method, wherein a pair having a high evaluation is used with priority in derivation of a function for transforming coordinates of a feature point in the second image into coordinates of a corresponding feature point in the first image using the RANSAC method.

According to yet another embodiment of the present invention, an image processing method comprises: obtaining, a plurality of pairs of a feature point in the first image and a feature point in the second image, wherein the pair of feature points are selected such that local feature amounts of the images at the feature points are similar; setting an evaluation for each of the pairs, the evaluation being set based on at least one of the number of feature points in the first image where local feature amounts are similar to a local feature amount at one of the pair or the number of feature points in the second image where local feature amounts are similar to a local feature amount at one of the pair, in such a manner that the smaller the number, the higher the evaluation; and determining a function having the highest transformation accuracy among derived functions by repeating the following steps, and determining a similarity between the first image and the second image based on the transformation accuracy of the determined function: deriving a function for transforming coordinates of a feature point in the second image into coordinates of a corresponding feature point in the first image using a selected pair that has been selected from the plurality of pairs based on the evaluation, and determining transformation accuracy of the function for transforming the coordinates of the feature point in the second image into the coordinates of the corresponding feature point in the first image using the plurality of pairs other than the selected pair.

According to still yet another embodiment of the present invention, a non-transitory computer-readable medium stores a program thereon for causing a computer to: obtain a plurality of pairs of a feature point in the first image and a feature point in the second image, wherein the pair of feature points are selected such that local feature amounts of the images at the feature points are similar; set an evaluation for each of the pairs, the evaluation being set based on at least one of the number of feature points in the first image where local feature amounts are similar to a local feature amount at one of the pair or the number of feature points in the second image where local feature amounts are similar to a local feature amount at one of the pair, in such a manner that the smaller the number of feature points, the higher the evaluation; and determine a similarity between the first image and the second image using a RANSAC method, wherein a pair having a high evaluation is used with priority in derivation of a function for transforming coordinates of a feature point in the second image into coordinates of a corresponding feature point in the first image using the RANSAC method.

According to yet still another embodiment of the present invention, a non-transitory computer-readable medium stores a program thereon for causing a computer to: obtain, a plurality of pairs of a feature point in the first image and a feature point in the second image, wherein the pair of feature points are selected such that local feature amounts of the images at the feature points are similar; set an evaluation for each of the pairs, the evaluation being set based on at least one of the number of feature points in the first image where local feature amounts are similar to a local feature amount at one of the pair or the number of feature points in the second image where local feature amounts are similar to a local feature amount at one of the pair, in such a manner that the smaller the number, the higher the evaluation; and determine a function having the highest transformation accuracy among derived functions by repeating the following steps, and determine a similarity between the first image and the second image based on the transformation accuracy of the determined function: deriving a function for transforming coordinates of a feature point in the second image into coordinates of a corresponding feature point in the first image using a selected pair that has been selected from the plurality of pairs based on the evaluation, and determining transformation accuracy of the function for transforming the coordinates of the feature point in the second image into the coordinates of the corresponding feature point in the first image using the plurality of pairs other than the selected pair.

Further features of the present invention will become apparent from the following description of exemplary embodiments (with reference to the attached drawings).

BRIEF DESCRIPTION OF THE DRAWINGS

FIG. 1 is a block diagram showing a device configuration of an image processing apparatus according to a first embodiment.

FIG. 2 is a block diagram showing an example of a functional configuration of the image processing apparatus according to the first embodiment.

FIG. 3 is a flowchart showing an example of an image processing method according to the first embodiment.

FIG. 4 is a flowchart showing an example of feature amount extraction processing according to the first embodiment.

FIGS. 7A and 7B show example schemas of a list of feature points pairs and a feature amount according to the first embodiment.

FIGS. 13A and 13B show example methods for dividing a two-dimensional feature amount space to form a grid-like pattern.

FIG. 14 shows an example schema of a feature amount according to the second embodiment.

DESCRIPTION OF THE EMBODIMENTS

Figure 5:
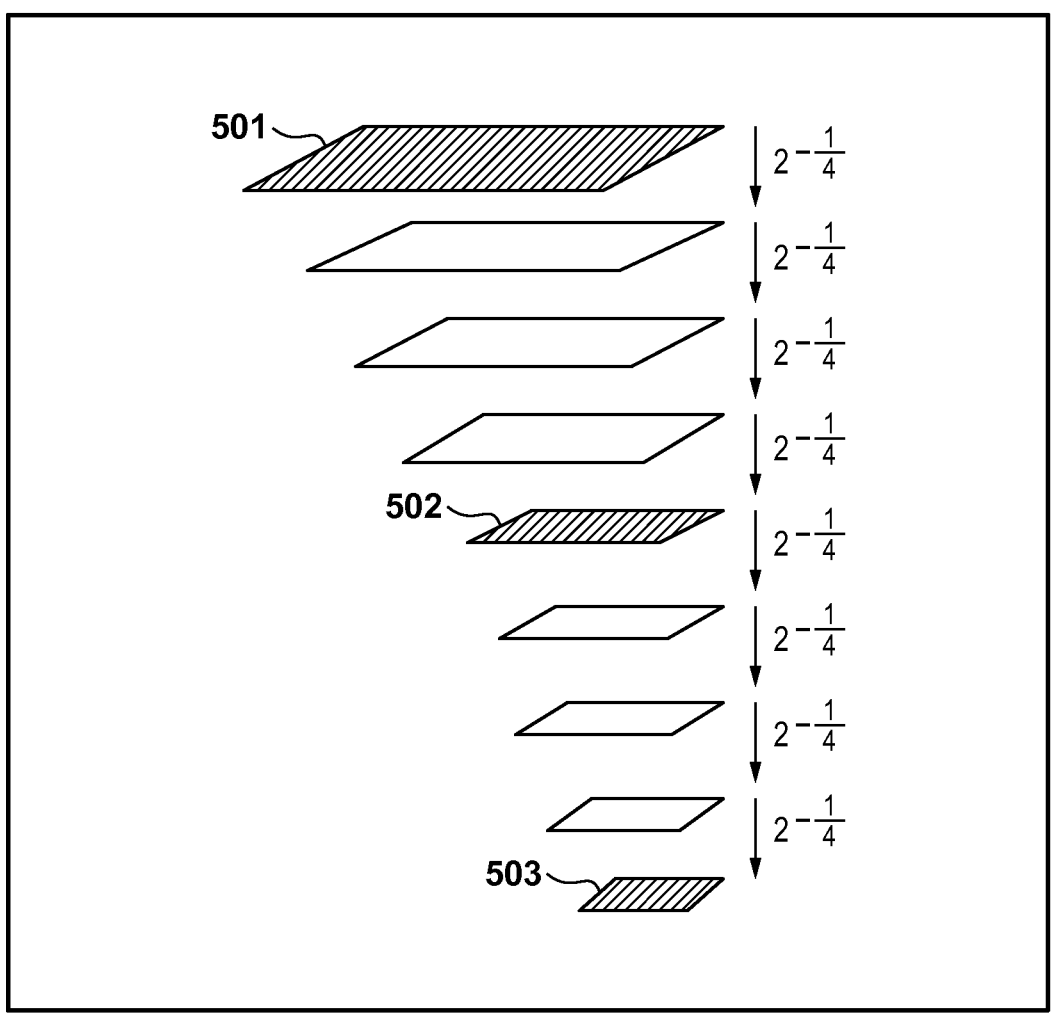
FIG. 5 is a diagram for describing an example of reduced image generation processing according to the first embodiment.

In RANSAC processing, in order to determine whether a search query image and a candidate image match each other, the following are repeated: selection of a feature points pair, derivation of a transformation matrix, and determination of whether the remaining feature points pairs satisfy the transformation. In general, the upper limit of the number of iterations is set to approximately 100. A high upper limit increases the required processing ability; on the other hand, a low upper limit constricts the achievement of stable search results and increases the possibility that similar images are determined to be unalike images.

In embodiments of the present invention, stable search results can be achieved in the search for a similar image through RANSAC processing using local feature amounts of images.

The following describes working examples of the present invention based on the drawings. It should be noted that the scope of the present invention is not limited to the following working examples.

[First Embodiment]

As mentioned earlier, in RANSAC processing, feature points pairs are associated based on a similarity between local feature amounts. If these feature points pairs show the same characteristics (if these feature points pairs are in correct association), there is a high possibility that a transformation matrix has been derived with high accuracy. On the other hand, in conventional RANSAC processing, feature points pairs are randomly selected, and hence there is a good possibility that the feature points pairs do not indicate the same characteristics (the feature points pairs are not in correct association). If the feature points pairs are not in correct association, there is a low possibility of derivation of a transformation matrix that can transform a feature point in a search query image into a feature point in a search target image (candidate image) with high accuracy. In this case, new feature points pairs are randomly selected after executing heavy processing for determining whether the remaining feature points pairs satisfy the transformation.

For example, in a case where the search query image includes a plurality of feature points having similar local feature amounts, a feature point in the search target image that is similar to the feature points in the search query image in terms of local feature amounts could possibly indicate characteristics shown by either one of the feature points in the search query image. Therefore, there is a good possibility that a feature point selected from the search target image for having a local feature amount similar to a local feature amount of one of the feature points in the search query image actually indicates characteristics which is indicated by another feature point in the search query image, that is to say, associated feature points do not indicate the same characteristics. The same goes for a case in which the search target image includes a plurality of feature points having similar local feature amounts.

In the present embodiment, a feature points pair that has a high possibility of being in correct association is selected. Specifically, a feature point is selected to derive a transformation matrix in such a manner that there are few feature points having local feature amounts similar to a local feature amount of the selected feature point. This makes it possible to omit futile derivation of a transformation matrix and determination processing based on a feature points pair that is not in correct association. By thus deriving a transformation matrix and executing determination processing using a feature points pair that has a high possibility of being in correct association, the number of effective iterations increases, even if the number of iterations in RANSAC processing is the same. It is hence possible to achieve reliable determination results in a stable manner compared with conventional techniques. Furthermore, by reducing the number of iterations, the speed of image comparison processing can be increased while achieving stable search results.

The following describes a first embodiment of the present invention with reference to the drawings. A configuration of a computer apparatus 100 according to the present embodiment will now be described with reference to a block diagram of FIG. 1. The computer apparatus 100 may be a server apparatus, a client apparatus, or the like. A server apparatus or a client apparatus may be realized by a single computer apparatus 100; alternatively, a server apparatus, a client apparatus, or the like may be realized by distributing different functions to a plurality of computer apparatuses 100 as necessary. In a case where a server apparatus, a client apparatus, or the like is constituted by a plurality of computer apparatuses 100, the computer apparatuses 100 are connected by a communication equipment such as a local area network (LAN) such that the computer apparatuses 100 can communicate with one another. A computer apparatus 100 can be realized by an information processing apparatus such as a personal computer (PC) and a workstation (WS).

In FIG. 1, a CPU 101 is a central processing unit that controls the entirety of the computer apparatus 100. A ROM 102 is a read-only memory that stores programs, parameters, or the like that need not be changed. A RAM 103 is a random-access memory that temporarily stores programs, data, or the like supplied from, for example, an external apparatus. An external storage apparatus 104 may be, for example, a hard disk, a memory card, or the like that is installed in the computer apparatus 100. The external storage apparatus 104 may also be an optical disc such as a flexible disc (FD) and a compact disc (CD), a magnetic card, an optical card, an IC card, a memory card, or the like that is attachable to and removable from the computer apparatus 100.

An input interface 105 is an interface for connecting the computer apparatus 100 and an input device 109. The input device 109 inputs data to the computer apparatus 100 in response to a user operation. The input device 109 may be, for example, a pointing device, a keyboard, or the like. An output interface 106 is an interface for connecting the computer apparatus 100 and an output device such as a monitor 110 and a printer. The monitor 110 displays, for example, data held in the computer apparatus 100 or data supplied to the computer apparatus 100. A communication interface 107 connects the computer apparatus 100 to a network line 111 such as the Internet, or to an external device such as a digital camera 112, a digital video camera 113, and a smartphone 114. A system bus 108 is a transmission path for connecting the constituents 101 to 107 such that they can perform communication.

The operations of later-described units can be realized as follows: programs corresponding to the operations of the constituents, which are stored in a computer-readable storage medium such as the ROM 102 and the external storage apparatus 104, are deployed to the RAM 103, and the CPU 101 operates in accordance with the deployed programs. It should be noted that the operations of all or a part of the later-described units may be realized by dedicated hardware.

Next, image processing according to the first embodiment will be described. An image processing apparatus 200 according to the first embodiment extracts image feature amounts from a comparison source image and a comparison target image, compares the comparison source image with the comparison target image in accordance with the extracted image feature amounts, and displays the comparison result. The image processing apparatus 200 can be realized using, for example, the computer apparatus 100. FIG. 2 is a block diagram showing an example of a functional configuration of the image processing apparatus 200. The operations performed by the units shown in FIG. 2 will be described later in detail.

An image obtaining unit 201 obtains a comparison source image and a comparison target image. No particular limitation is intended regarding the type of the images; the images may be ordinary two-dimensional images or multi-dimensional images. A feature amount extraction unit 202 extracts a feature point group composed of a plurality of feature points from the comparison source image and the comparison target image obtained by the image obtaining unit 201. The feature amount extraction unit 202 also calculates local feature amounts of the images in one-to-one correspondence with the feature points.

A feature amount comparison unit 203 obtains a plurality of feature points pairs by generating, based on similarities between the local feature amounts, a plurality of feature points pairs each composed of a feature point in the comparison source image and a feature point in the comparison target image. Specifically, the feature amount comparison unit 203 generates pairs of the coordinates of a feature point in the comparison source image and the coordinates of a feature point in the comparison target image, the feature points having similar local feature amounts in the images. The feature amount comparison unit 203 also sets evaluation values in one-to-one correspondence with the feature points pairs. Specifically, the feature amount comparison unit 203 sets an evaluation value of each feature points pair based on at least one of the number of feature points in the comparison source image that have local feature amounts similar to a local feature amount of one of feature points composing the feature points pair and the number of feature points in the comparison target image that have local feature amounts similar to the local feature amount of one of the feature points composing the feature points pair. The smaller the number(s) of such feature points, the larger the evaluation value.

A similarity calculation unit 204 determines a similarity between the comparison source image and the comparison target image. In the present embodiment, the similarity calculation unit 204 executes RANSAC processing to derive a transformation matrix for transforming the comparison target image into the comparison source image, and calculates a value indicating the similarity between the comparison source image and the comparison target image based on the transformation accuracy of the transformation matrix. In the present embodiment, an affine transformation matrix, in particular a similarity transformation matrix is derived. It should be noted that a function derived from RANSAC processing need not be expressed in the form of a transformation matrix for transforming the comparison target image into the comparison source image, and no particular limitation is intended regarding such a function as long as it transforms the coordinates in one image into the coordinates in another image. A result output unit 205 outputs the result of comparison by the similarity calculation unit 204 to, for example, the monitor 110 and the like. A storage unit 206 is, for example, the RAM 103 and the like, and stores data being processed. As stated earlier, the foregoing units are realized by the operation of the CPU 101.

FIG. 3 is a flowchart showing an example of processing executed by the image processing apparatus 200 according to the first embodiment. In step S301, the image obtaining unit 201 obtains the comparison source image and stores the same into the storage unit 206. In step S302, the feature amount extraction unit 202 extracts feature points and local feature amounts from the comparison source image.

FIG. 4 is a flowchart showing an example of the process of step S302. In the present embodiment, regional feature amounts (local feature amounts) of images are used as image feature amounts. In step S401, the feature amount extraction unit 202 extracts luminance components from the comparison source image, and generates a luminance component image based on the extracted luminance components.

In step S402, the feature amount extraction unit 202 repeatedly reduces the luminance component image in accordance with a scale factor (reduction ratio) p, thereby generating n reduced images that represent gradually reduced versions of the original luminance component image. Here, it is assumed that the n reduced images include the original luminance component image. It is also assumed that the scale factor p and the number n of the reduced images are preset. No particular limitation is intended regarding a method for generating the reduced images, and a known method may be used thereas. In the present embodiment, it is assumed that the reduced images are generated using linear interpolation.

FIG. 5 is a diagram for describing an example of the process of step S402. FIG. 5 shows a case in which the scale factor p is $2^{-(1/4)}$ and the number n of the reduced images is 9. It goes without saying that the scale factor p and the number n of the reduced images, which is 9, may have different values. FIG. 5 shows an original luminance component image 501 generated in step S401. FIG. 5 also shows a reduced image 502 obtained by recursively applying reduction processing to the luminance component image 501 four times in accordance with the scale factor p. FIG. 5 further shows a reduced image 503 obtained by recursively applying reduction processing to the luminance component image 501 eight times in accordance with the scale factor p. In the example of FIG. 5, the reduced image 502 is equivalent to an image obtained by reducing the vertical and horizontal lengths of the luminance component image 501 to ½, whereas the reduced image 503 is equivalent to an image obtained by reducing the vertical and horizontal lengths of the luminance component image 501 to ¼.

In step S403, the feature amount extraction unit 202 extracts feature points from the comparison source image. In the present embodiment, feature points are extracted from each of the n reduced images on the condition that the extracted feature points are robust against image rotation. By using the plurality of reduced images, feature points of various scales can be detected. No particular limitation is intended regarding the number of feature points extracted from each of the reduced images. No particular limitation is intended regarding a method for extracting feature points, and any conventionally known method may be used thereas. A description is now given of a method using the Harris operator described in C. Harris and M. J. Stephens, "A combined corner and edge detector" in Alvey Vision Conference, pages 147-152, 1988.

Specifically, the feature amount extraction unit 202 applies the Harris operator to the reduced images, obtains output images H, and looks for the following pixel values for each pixel in the output images H: a pixel value of a target pixel, and pixel values of eight pixels in the neighborhood of the target pixel. The target pixel is extracted as a feature point when the target pixel is the local maximum (when the target pixel has the largest pixel value among the total of nine pixels). In the present embodiment, even when the target pixel is the local maximum, the target pixel is not extracted as a feature point if its pixel value is equal to or smaller than a threshold.

In step S404, the feature amount extraction unit 202 calculates feature amounts (local feature amounts) in one-to-one correspondence with the feature points extracted in step S403; here, the feature amounts are defined to be invariant under image rotation. No particular limitation is intended regarding a method for calculating the local feature amounts, and any conventionally known method, such as SIFT, can be used thereas. A description is now given of a method using local jets and a combination of derivatives thereof described in J. J. Koenderink and A. J. van Doorn, "Representation of local geometry in the visual system," Riological Cybernetics, vol. 55, pages 367-375, 1987.

In order to make a feature amount invariant under image rotation, the feature amount is calculated after applying rotation correction to a feature extraction region so that the direction of the maximum density gradient is set to, for example, 0 degrees. Specifically, a local feature amount V is calculated using the following expression (1).

[Math 1]

$$v = \begin{pmatrix} L \\ L_x L_x + L_y L_y \\ L_{xx} L_x L_x + 2L_{xy} L_x L_y + L_{yy} L_y L_y \\ L_{xx} + L_{yy} \\ L_{xx} L_{xx} + 2L_{xy} L_{xy} + L_{yy} L_{yy} \end{pmatrix} \quad (1)$$

The signs used in the right-hand side of expression (1) are defined by the following expressions (2) to (7). In the right-hand side of expression (2), G(x, y) is a Gaussian function, I(x, y) is a pixel value at the coordinates (x, y) in an image, and "*" is a sign denoting a convolution operation. Expression (3) is a partial derivative related to x of a variable L defined by expression (2), and expression (4) is a partial derivative related to y of the same variable L. Expression (5) is a partial derivative related to y of a variable Lx defined by expression (3), expression (6) is a partial derivative related to x of the variable Lx defined by expression (3), and expression (7) is a partial derivative related to y of Ly defined by expression (4).

[Math 2]

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

In this way, a local feature amount group calculated for the plurality of feature points can be obtained. In the present embodiment, one local feature amount group is generated for one comparison source image by assembling the local feature amounts obtained from the plurality of reduced images. Specifically, a combination of the coordinates of a feature point and a local feature amount of the feature point is recorded for each of the plurality of feature points. In the present embodiment, the coordinates of a corresponding point in the original image (unreduced image) are recorded as the coordinates of a feature point extracted from a reduced image.

In step S303, the image obtaining unit 201 obtains the comparison target image and stores the same into the storage unit 206. In step S304, the feature amount extraction unit 202 extracts feature points and local feature amounts from the comparison target image. These processes are executed similarly to the processes of steps S301 and S302.

Figure 6A:
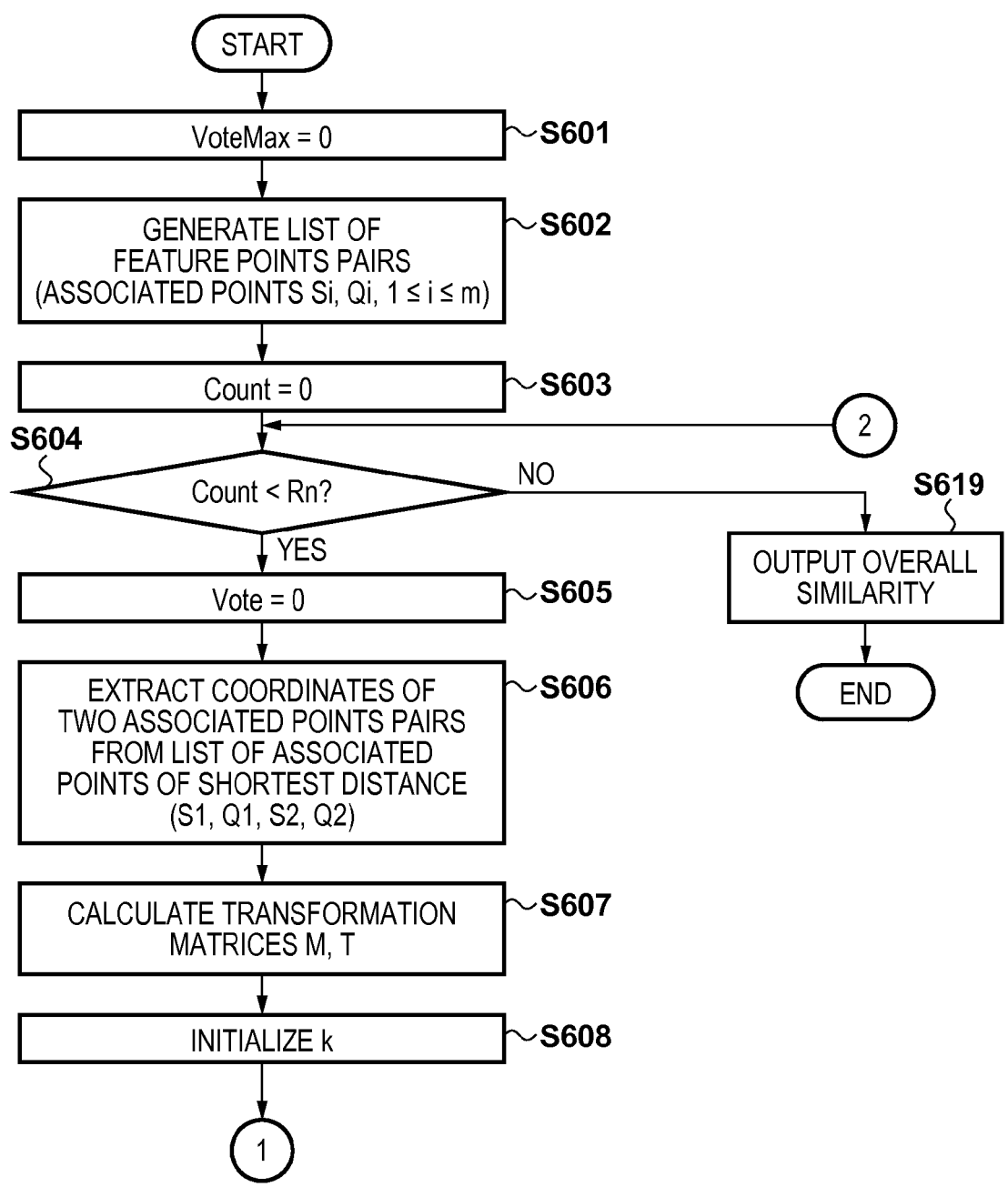
FIGS. 6A and 6B are flowcharts showing an example of feature amount comparison processing according to the first embodiment.
Figure 6B:
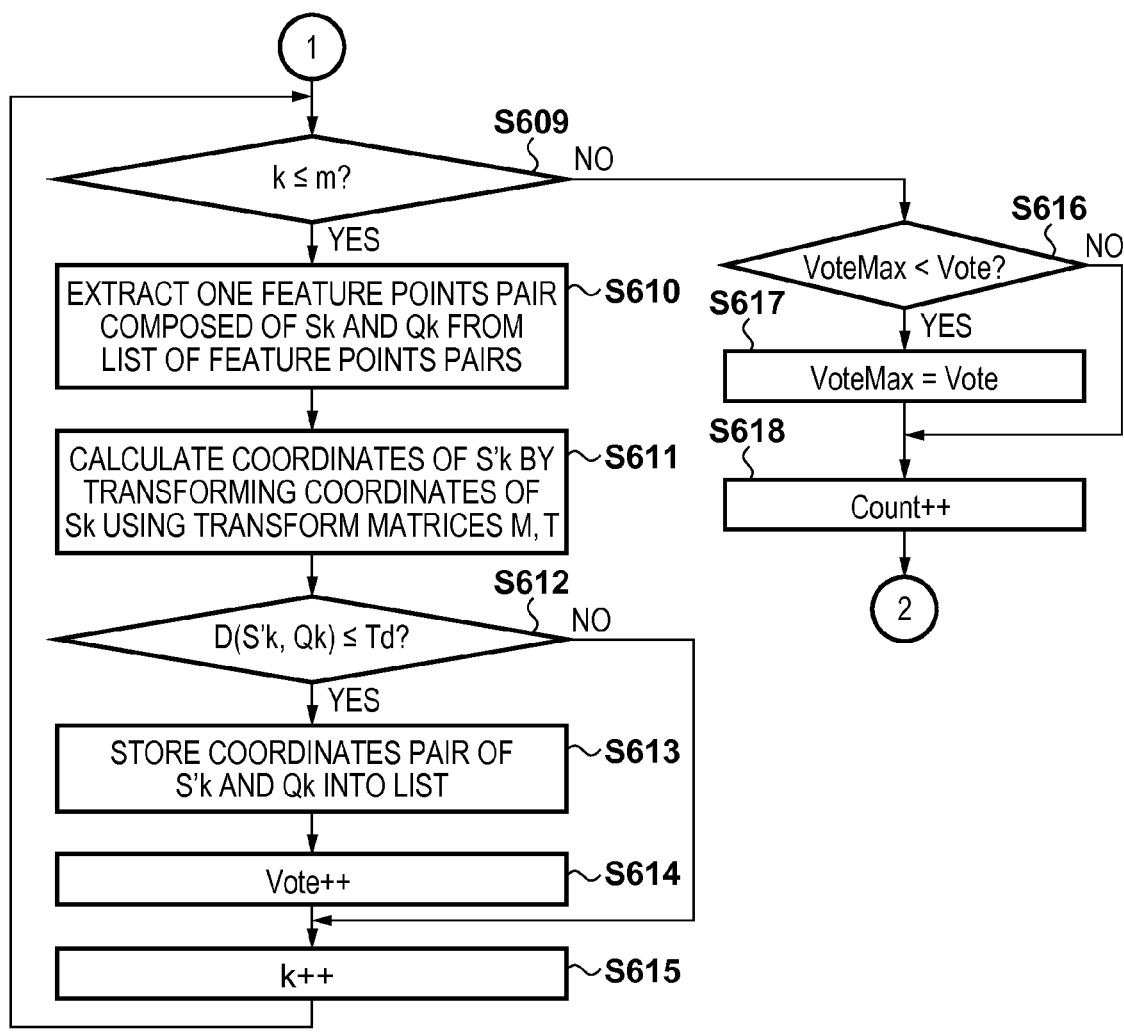

In step S305, the feature amount comparison unit 203 and the similarity calculation unit 204 determine a similarity between the comparison source image and the comparison target image. FIGS. 6A and 6B are flowcharts showing an example of the process of step S305. Below, it is assumed that one of feature points in the comparison source image is Q(x', y), and a local feature amount at the feature point Q is Vq. It is also assumed that one of feature points in the comparison target image is S(x, y), and a local feature amount at the feature point S is Vs.

In step S601, the feature amount comparison unit 203 initializes a variable VoteMax indicating the final number of votes to 0. Next, in step S602, the feature amount comparison unit 203 calculates the distance between feature amounts for every combination of a feature point in the comparison source image and a feature point in the comparison target image. That is to say, the feature amount comparison unit 203 executes, for every combination, processing for calculating an inter-vector distance between the local feature amount Vq (vector) at the feature point Q and the local feature amount Vs (vector) at the feature point S. The feature amount comparison unit 203 also generates a list of feature points pairs based on the obtained distances between feature amounts. A feature points pair denotes a pair of a feature point in the comparison source image and a feature point in the comparison target image that have similar local feature amounts, that is to say, a pair of feature points having neighbor local feature amounts. For example, the feature amount comparison unit 203 can generate a list of feature points pairs by extracting, for each feature point in the comparison source image, a feature point in the comparison target image whose feature amount is least distant from the feature amount of the feature point in the comparison source image. The feature amount comparison unit 203 may extract only a feature point in the comparison target image that satisfies the following conditions: its feature amount is least distant from the feature amount of the feature point in the comparison source image, and the distance therebetween is equal to or smaller than a threshold (equal to or smaller than Tv).

FIG. 7A shows an example of a list of feature points pairs. Hereinafter, the $k^{th}$ feature point in the comparison source image is referred to as $Qk(x'_k, y'_k)$, and a feature point in the comparison target image that composes a feature points pair together with the feature point Qk is referred to as $Sk(x_k, y_k)$. Also, local feature amounts at the feature points Qk and Sk are referred to as $Vq(k)$ and $Vs(k)$. As shown in FIG. 7A, the following are recorded for each feature point Qk in the comparison source image: an identifier, or ID, of the feature point Qk, a local feature amount $Vq(k)$ thereat, and a local feature amount $Vs(k)$ at the corresponding feature point Sk in the comparison target image. In the present embodiment, the number of feature points in the comparison source image is m. Below, for the sake of explanation, it is assumed that a feature point in the comparison target image that is paired with a feature point in the comparison source image has already been determined for every feature point in the comparison source image. A method for detecting such a feature point Sk in the comparison target image that is paired with a feature point Qk in the comparison source image will be described later in more detail with reference to FIG. 10.

In the present embodiment, the feature amount comparison unit 203 further obtains, for each feature point in the comparison source image, the number of feature points in the comparison source image that have similar local feature amounts. For example, the feature amount comparison unit 203 obtains the number of feature points in the comparison source image whose feature amounts are distant from the feature amount of the feature point Qk in the comparison source image by a threshold Tv or smaller, that is to say, the number $Nq(k)$ of feature points having neighbor local feature amounts. A method for calculating $Nq(k)$ will be described later in detail with reference to FIG. 9. The feature amount comparison unit 203 further obtains, for each feature point in the comparison source image, the number of feature points in the comparison target image that have similar local feature amounts. For example, the feature amount comparison unit 203 obtains the number of feature points in the comparison target image whose feature amounts are distant from the feature amount of the feature point Qk in the comparison source image by the threshold Tv or smaller, that is to say, the number $Ns(k)$ of feature points having neighbor local feature amounts. A method for calculating $Ns(k)$ will be described later in detail with reference to FIG. 10. Such information and an inter-vector distance $DV(k)$ between the local feature amounts $Vq(k)$ and $Vs(k)$ are also recorded into the list of feature points pairs.

The feature amount comparison unit 203 further calculates a product of $Nq(k)$ and $Ns(k)$. This product is equivalent to the number of combinations of feature points having neighbor feature amounts in the comparison target image and the comparison source image, and is used as an evaluation value $N(k)$ indicating the reliability of a feature points pair. It is considered that the larger the evaluation value $N(k)$, the higher the possibility of the feature points pair being an erroneously associated pair that does not show the same characteristics. That is to say, a smaller evaluation value $N(k)$ indicates higher evaluation of the feature points pair, suggesting that the feature points pair should be selected as a priority in calculation of a transformation matrix. This will be described in more detail in connection with step S606. It should be noted that a sum of $Nq(k)$ and $Ns(k)$ may be used in place of the product of $Nq(k)$ and $Ns(k)$. This sum similarly indicates the reliability of the feature points pair.

In another embodiment, the evaluation value $N(k)$ is calculated in consideration of the parameter other than $Nq(k)$ and $Ns(k)$. For example, in one embodiment, it can be calculated further in consideration of a similarity between local feature amounts $Vq(k)$ and $Vs(k)$ at feature points composing a feature points pair. For example, the evaluation value $N(k)$ can be set in such a manner that the smaller the difference between $Vq(k)$ and $Vs(k)$, the smaller the evaluation value $N(k)$ (the higher the evaluation). In one embodiment, $N(k)$ is calculated as follows.

$$N(k) = W1 \times Nq(k) \times Ns(k) + W2 \times |Vq(k) - Vs(k)|$$

W1 and W2 are weighting coefficients and can be set as appropriate. For example, W1 and W2 may be specified in advance. In such an embodiment, the feature points pair having a higher possibility of of correct association and having a higher similarity between $Vq(k)$ and $Vs(k)$ is more likely to be selected as a feature points pair used to derive a transformation matrix.

In the present embodiment, the evaluation value of a feature points pair is calculated by combining $Nq(k)$ and $Ns(k)$; however, when $Nq(k)$ and $Ns(k)$ are viewed separately, it is considered that the larger the value of $Nq(k)$ or $Ns(k)$, the higher the possibility of the feature points pair being an erroneously associated pair. Therefore, the evaluation value $N(k)$ of a feature points pair may be one of $Nq(k)$ and $Ns(k)$. Such a configuration, in which heavy processing for calculating one of $Nq(k)$ and $Ns(k)$ is omitted, is also expected to reduce the number of iterative processes.

Furthermore, in the present embodiment, the evaluation value $N(k)$ is calculated based on the number $Nq(k)$ of feature points in the comparison source image that have local feature amounts similar to the local feature amount of the feature point Qk in the comparison source image, and on the number $Ns(k)$ of feature points in the comparison target image that have local feature amounts similar to the local feature amount of the feature point Qk in the comparison source image. However, the local feature amount of the feature point Qk and the local feature amount of the feature point Sk are similar. Therefore, the evaluation value $N(k)$ may be calculated based on the number of feature points in the comparison source image that have local feature amounts similar to the local feature amount of the feature point Sk in the comparison target image, and on the number of feature points in the comparison target image that have local feature amounts similar to the local feature amount of the feature point Sk in the comparison target image. As indicated above, in one embodiment, the evaluation value $N(k)$ is calculated based on at least one of the number of feature points in the comparison source image that have local feature amounts similar to the local feature amount of one of feature points composing a feature points pair and the number of feature points in the comparison target image that have local feature amounts similar to the local feature amount of one of the feature points composing the feature points pair.

FIG. 7B shows an example of information that is recorded for one feature point. As shown in FIG. 7B, the following are recorded for each of feature points in the comparison source image and feature points in the comparison target image: the local feature amount Vq(k) or Vs(k), the coordinates $(x'_k, y'_k)$ or $(x_k, y_k)$, and a rotation correction amount at the time of calculation of the local feature amount.

It should be noted that it is not imperative to calculate and record all of the information shown in FIGS. 7A and 7B. For example, as will be described later, in the present embodiment, it is not imperative to use both of Nq(k) and Ns(k), and unused information need not be calculated.

Figure 8:
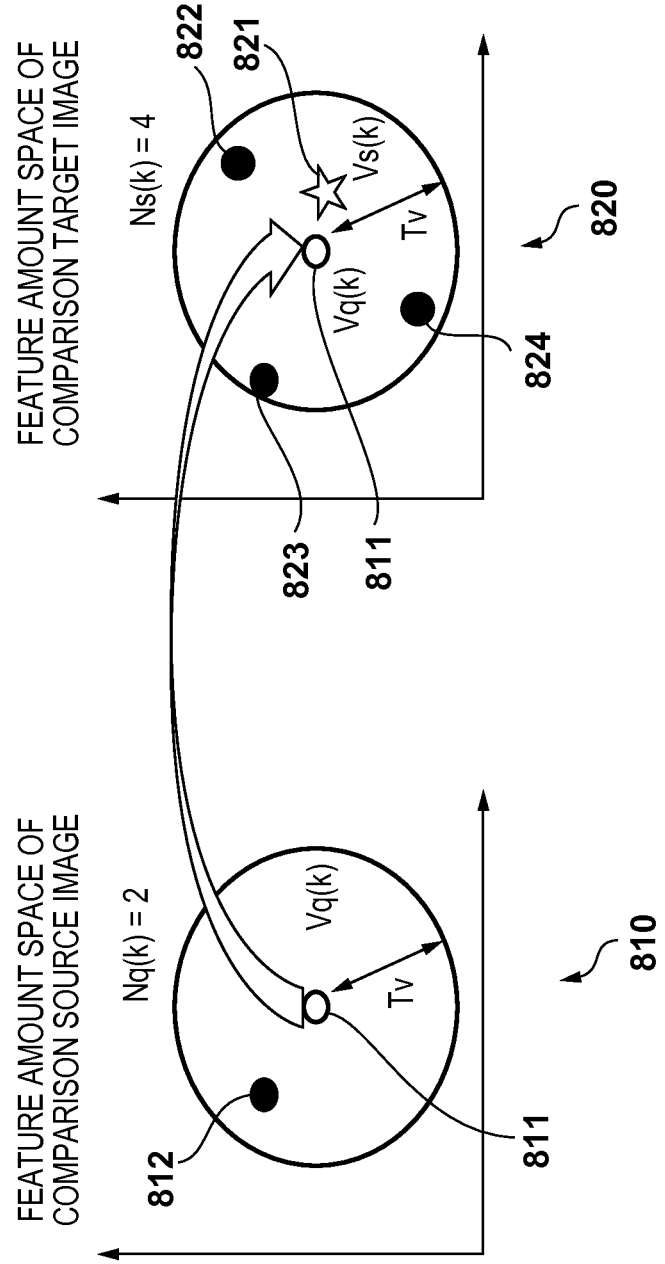
FIG. 8 shows an example of distribution of local feature amounts in a feature amount space.

An example of distribution of local feature amounts in a feature amount vector space will now be discussed with reference to FIG. 8. FIG. 8 shows a feature amount space 810 of the comparison source image and a feature amount space 820 of the comparison target image. Local feature amounts 811, 812 at feature points in the comparison source image are shown in the feature amount space 810. On the other hand, local feature amounts 821 to 824 at feature points in the comparison target image are shown in the feature amount space 820. For the sake of illustration, the feature amount spaces are shown as two-dimensional spaces.

The feature amount space 810 shows the local feature amount Vq(k) 811 at the feature point Qk, and a circle that is centered at this feature amount Vq(k) 811 and has a radius of Tv (distance threshold). The local feature amount Vq(k) 811 and the local feature amount 812 exist inside this circle. Therefore, in the comparison source image, the number Nq(k) of feature points whose feature amounts are distant from the feature amount of the feature point Qk in the comparison source image by the threshold Tv or smaller is two.

Similarly, the feature amount space 820 shows the local feature amount Vq(k) 811 at the feature point Qk, and a circle that is centered at this feature amount Vq(k) 811 and has a radius of Tv (distance threshold). The local feature amounts 821 to 824 exist inside this circle. Therefore, in the comparison target image, the number Ns(k) of feature points whose feature amounts are distant from the feature amount of the feature point Qk in the comparison source image by the threshold Tv or smaller is four. FIG. 8 also shows the local feature amount Vs(k) 821 that is closest to the local feature amount Vq(k) 811, and corresponding feature points Qk and Sk compose a feature points pair. In this case, the value Nq(k)×Ns(k), which indicates the number of combinations of feature points having neighbor feature amounts in the comparison target image and comparison source image, is 2×4=8.

Figure 9:
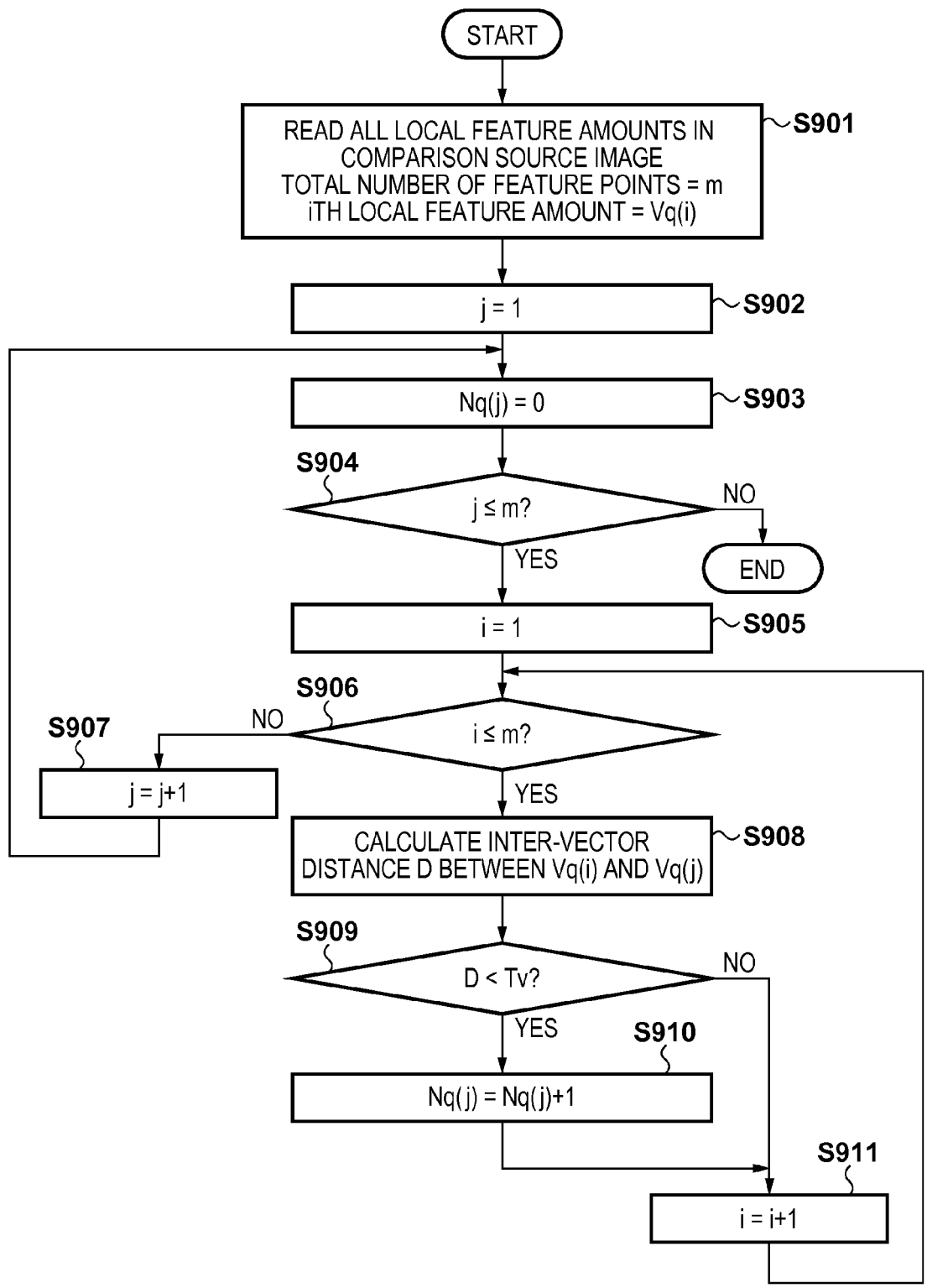
FIG. 9 is a flowchart showing an example method for calculating Nq(k) according to the first embodiment.

With reference to a flowchart of FIG. 9, a description is now given of example processing for calculating the number Nq(k) of feature points in the comparison source image that have local feature amounts similar to the local feature amount of the feature point Qk. In step S901, the feature amount comparison unit 203 reads local feature amounts at feature points in the comparison source image, which have been calculated by the feature amount extraction unit 202. Below, it is assumed that the total number of feature points in the comparison source image is m, and a local feature amount at the $i^{th}$ feature point Qi is noted as Vq(i).

In step S902, the feature amount comparison unit 203 initializes a variable j to 1. In step S903, the feature amount comparison unit 203 initializes a variable Nq(j) to 0.

In step S904, the feature amount comparison unit 203 determines whether the processes of steps S905 to S911 have been executed for all of the m feature points, that is to say, whether j exceeds m. If the processes have been completed for all of the m feature points, processing of FIG. 9 is ended. If the processes have not been completed for all of the m feature points, processing proceeds to step S905.

In step S905, the feature amount comparison unit 203 initializes a variable i to 1. In step S906, the feature amount comparison unit 203 determines whether the processes of steps S908 to S911 have been executed for all of the m feature points, that is to say, whether i exceeds m. If the processes have been completed for all of the m feature points, processing proceeds to step S907. If the processes have not been completed for all of the m feature points, processing proceeds to step S908. In step S907, the feature amount comparison unit 203 adds 1 to the variable j. Thereafter, processing returns to step S903.

In step S908, the feature amount comparison unit 203 calculates an inter-vector distance D between the local feature amounts Vq(i) and Vq(j). In step S909, the feature amount comparison unit 203 determines whether the calculated distance D is smaller than the threshold Tv. If the distance D is smaller than the threshold Tv, it means that the local feature amount Vq(i) and the local feature amount Vq(j) are similar. If the distance D is smaller than the threshold Tv, processing proceeds to step S910. If the distance D is equal to or larger than the threshold Tv, processing proceeds to step S911.

In step S910, the feature amount comparison unit 203 adds 1 to the variable Nq(j). The feature amount comparison unit 203 adds 1 to the variable i in step S911, and then processing returns to step S906.

In this way, the number Nq(k) of feature points in the comparison source image that have local feature amounts similar to the local feature amount of the feature point Qk is calculated. The calculated Nq(k) is recorded into the list of feature points pairs.

Figure 10:
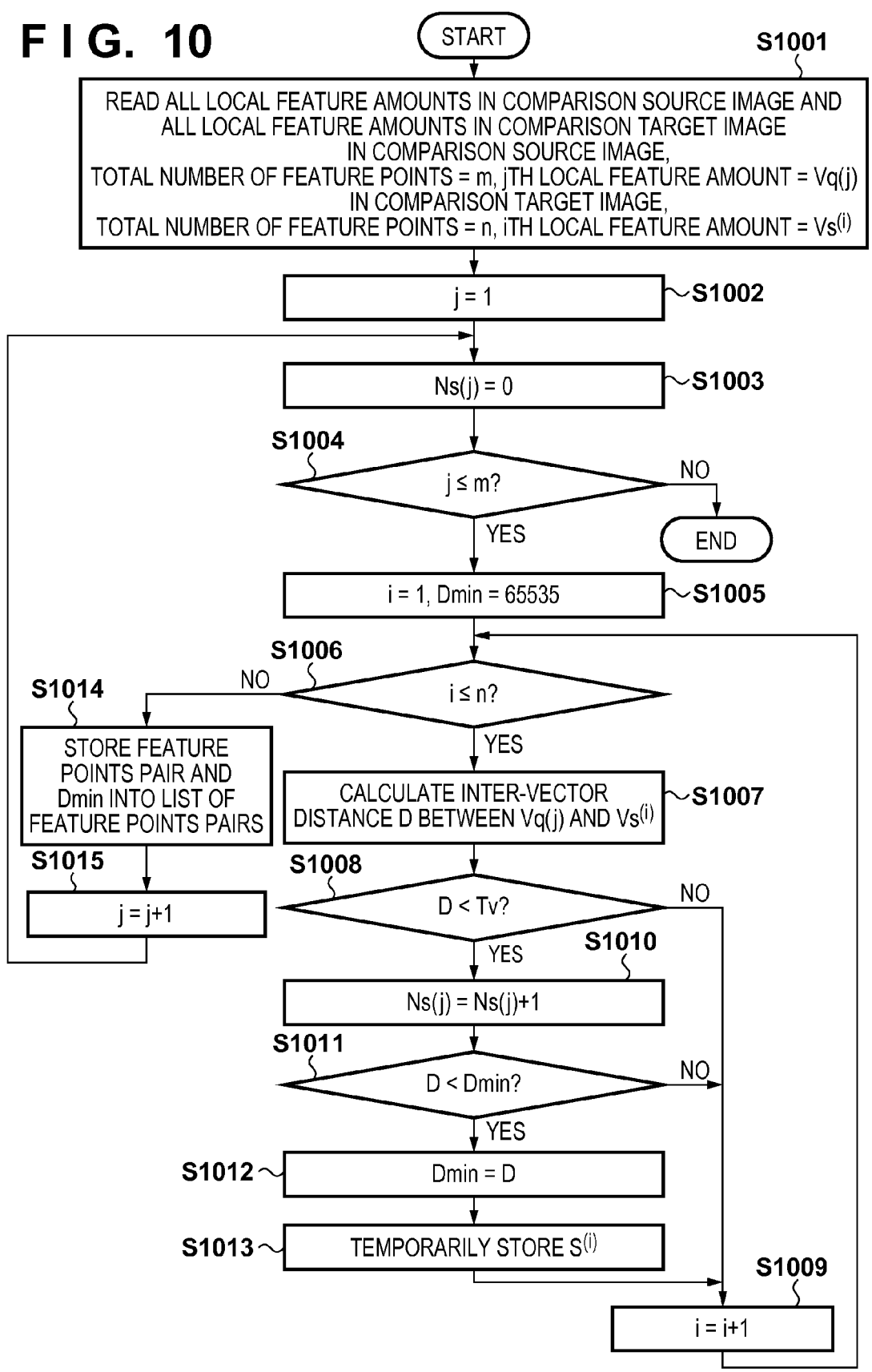
FIG. 10 is a flowchart showing an example method for calculating Ns(k) according to the first embodiment.

With reference to a flowchart of FIG. 10, a description is now given of example processing for calculating the number Ns(k) of feature points in the comparison target image that have local feature amounts similar to the local feature amount of the feature point Qk. In step S1001, the feature amount comparison unit 203 reads local feature amounts at feature points in the comparison source image and the comparison target image, which have been calculated by the feature amount extraction unit 202. Below, it is assumed that the total number of feature points in the comparison source image is m, and a local feature amount at the $j^{th}$ feature point Qj is noted as Vq(j). It is also assumed that the total number of feature points in the comparison target image is n, and a local feature amount at the $i^{th}$ feature point $S^{(i)}$ is noted as $Vs^{(i)}$.

In step S1002, the feature amount comparison unit 203 initializes a variable j to 1. In step S1003, the feature amount comparison unit 203 initializes a variable Ns(j) to 0.

In step S1004, the feature amount comparison unit 203 determines whether the processes of steps S1005 to S1013 have been executed for all of the m feature points, that is to say, whether j has reached m. If the processes have been executed for all of the feature points, processing of FIG. 10 is ended. If the processes have not been executed for all of the feature points, processing proceeds to step S1005. In step S1005, the feature amount comparison unit 203 initializes a variable i to 1, and initializes a variable Dmin to a value that is sufficiently larger than the threshold Tv, e.g., to 65535.

In step S1006, the feature amount comparison unit 203 determines whether the processes of steps S1007 to S1013 have been executed for all of the n feature points, that is to say, whether i has reached n. If the processes have been executed for all of the feature points, processing proceeds to step S1014. If the processes have not been executed for all of the feature points, processing proceeds to step S1007. In step S1014, if there is a feature point that was tentatively selected in step S1013, the feature amount comparison unit 203 registers this feature point as a feature point Sj to be paired with the feature point Qj with the list of feature points pairs. The feature amount comparison unit 203 also registers a local feature amount Vs(j) at the feature point Sj with the list of feature points pairs. The feature amount comparison unit 203 further registers a value of the variable Dmin as an inter-vector distance DV(j) between the feature point Qj and the feature point Sj with the list of feature points pairs. Then, the feature amount comparison unit 203 registers the obtained Ns(k) with the list of feature points pairs. The feature amount comparison unit 203 adds 1 to the variable j in step S1015, and then processing returns to step S1003.

In step S1007, the feature amount comparison unit 203 calculates an inter-vector distance D between the local feature amount Vq(j) at the feature point Qj and the local feature amount $Vs^{(i)}$ at the feature point $S^{(i)}$. In step S1008, the feature amount comparison unit 203 determines whether the distance D calculated in step S1007 is smaller than the threshold Tv. If the distance D is smaller than the threshold Tv, it means that the local feature amount Vq(j) and the local feature amount $Vs^{(i)}$ are similar. If the distance D is smaller than the threshold Tv, processing proceeds to step S1010. If the distance D is equal to or larger than the threshold Tv, processing proceeds to step S1009. In step S1009, the feature amount comparison unit 203 adds 1 to the variable i. Thereafter, processing returns to step S1006.

In step S1010, the feature amount comparison unit 203 adds 1 to the variable Ns(j). In step S1011, the feature amount comparison unit 203 determines whether the distance D calculated in step S1007 is smaller than the variable Dmin. If the distance D is smaller than the variable Dmin, it means that the local feature amount $Vs^{(i)}$ is more similar to the local feature amount Vq(j) than the local feature amounts $Vs^{(1)}$ to $Vs^{(i-1)}$ are. If the distance D is smaller than the variable Dmin, processing proceeds to step S1012. If the distance D is equal to or larger than the variable Dmin, processing returns to step S1009.

In step S1012, the feature amount comparison unit 203 sets the distance D calculated in step S1007 to the variable Dmin. In step S1013, the feature amount comparison unit 203 tentatively selects the feature point $S^{(i)}$. The tentatively selected feature point $S^{(i)}$ has the local feature amount that is most similar to the local feature amount Vq(j) among the compared feature points $S^{(1)}$ to $S^{(i)}$. If a feature point that has the local feature amount more similar to the local feature amount Vq(j) is discovered in subsequent processes, the selected feature point is updated. Thereafter, processing returns to step S1009.

In this way, the feature point Sk in the comparison target image whose local feature amount is most similar to the local feature amount of the feature point Qk is determined, and the number Ns(k) of feature points in the comparison target image that have local feature amounts similar to the local feature amount of the feature point Qk is calculated. In the present embodiment, the feature point Sk in the comparison target image that satisfies the following conditions is selected to be paired with the feature point Qk: its local feature amount is closest to the local feature amount of the feature point Qk, and the difference between these local feature amounts is equal to or smaller than the threshold Tv.

In step S602, the feature amount comparison unit 203 generates the list of feature points pairs shown in FIG. 7A in the above-described manner. In the present embodiment, the feature amount comparison unit 203 sorts the list of feature points pairs such that the values of N(k) are arranged in ascending order.

In step S603, the similarity calculation unit 204 initializes a variable Count to 0. The variable Count indicates the number of times the derivation of transformation matrices and evaluation processing (steps S605 to S618) have been iterated. Next, in step S604, the similarity calculation unit 204 determines whether the number of iterations Count exceeds a preset maximum number of iterations Rn. If the number of iterations Count exceeds the preset maximum number of iterations Rn, processing proceeds to step S619. If the number of iterations Count does not exceed the preset maximum number of iterations Rn, processing proceeds to step S605. In step S619, the similarity calculation unit 204 outputs the final number of votes VoteMax to the result output unit 205, and ends processing of FIGS. 6A and 6B. The output final number of votes VoteMax is associated with a similarity transformation that earned the largest number of votes among similarity transformations derived in step S607, and indicates a similarity between the comparison source image and the comparison target image. In step S605, the similarity calculation unit 204 initializes a variable Vote indicating the number of votes to 0.

In step S606, the similarity calculation unit 204 refers to the list of feature points pairs, and extracts two feature points pairs. In an ordinary RANSAC method, two feature points pairs are randomly selected from among a plurality of feature points pairs. However, in the present embodiment, feature points pairs that have a low possibility of being erroneously associated pairs, which do not show the same characteristics, are selected by referring to the above-described evaluation values N(k) of feature points pairs.

That is to say, the larger N(k), the higher the possibility of a feature points pair being an erroneously associated pair. For example, when N(k)=2, the chance of a feature points pair being in correct association is roughly ½. On the other hand, by selecting feature points pairs with small N(k), the processes of steps S610 to S615 can be executed using feature points pairs that have a high possibility of being in correct association. In this way, in the present embodiment, two feature amounts pairs are selected from among a plurality of feature amounts pairs based on the evaluation values N(k).

Ideally, feature points pairs with Nq(k)=Ns(k)=1 will be selected. However, such feature points pairs do not always exist. In the present embodiment, feature points pairs having the smallest possible N(k) are selected with priorities. In step S602, the list of feature points pairs is sorted such that the values of N(k) are arranged in ascending order. Therefore, the similarity calculation unit 204 can select two consecutive feature points pairs, starting from the top of the list. In one specific example, the similarity calculation unit 204 selects a feature points pair with k=1 and a feature points pair with k=2 in the first processing, and selects the feature points pair with k=2 and a feature points pair with k=3 in the second processing. In this way, the similarity calculation unit 204 keeps selecting two consecutive feature points pairs, shifting down by one pair during each selection process.

It should be noted that the above-described method for selecting feature points pairs is merely an example. For example, a feature points pair with k=1 and a feature points pair with k=2 may be selected in the first processing, and a feature points pair with k=1 and a feature points pair with k=3 may be selected in the second processing. The following describes a case in which a first set composed of two or more feature points pairs is selected first, and then a second set composed of two or more pairs is selected. In one embodiment, sets of feature amounts pairs are selected in such a manner that a set of feature amounts pairs with obviously low evaluations (or large evaluation values) is not selected first. For example, two sets are selected in such a manner that the evaluation of at least one feature amounts pair included in the first set is higher than the evaluation of at least one feature amounts pair included in the second set. In another embodiment, sets of feature amounts pairs are selected in accordance with a feature amounts pair that is given the highest evaluation among feature amounts pairs included in the sets of feature amounts pairs. For example, two sets are selected in such a manner that the highest one of evaluations given to pairs included in the first set is equal to or higher than the highest one of evaluations given to pairs included in the second set. Furthermore, sets of feature amounts pairs may be selected based on values that are calculated based on the evaluation values of feature amounts pairs included in the sets of feature amounts pairs. For example, two sets can be selected in such a manner that a sum, a product, or the like of the evaluation values of feature amounts pairs included in the first set is smaller than a sum, a product, or the like of the evaluation values of feature amounts pairs included in the second set. Such a selection method is applicable also to a case in which three or more feature amounts pairs are selected.

In step S607, the similarity calculation unit 204 derives functions for transforming the coordinates of a feature point in a transformation target image into the coordinates of a corresponding feature point in a transformation source image. In this process, which is similar to a process executed in an ordinary RANSAC method, the feature amounts pairs that were selected based on the evaluation values N(k) in step S606 are used to derive the functions. Below, it is assumed that feature points composing one feature points pair are Q1(x'$_1$, y'$_1$) and S1(x$_1$, y$_1$), whereas feature points composing the other feature points pair are Q2(x'$_2$, y'$_2$) and S2(x$_2$, y$_2$).

First, assuming that Q1(x'$_1$, y'$_1$), S1(x$_1$, y$_1$), Q2(x'$_2$, y'$_2$), and S2(x$_2$, y$_2$) satisfy the transformations indicated by expression (8), variables a to f in expression (8) are obtained. A matrix composed of variables a to d is referred to as a transformation matrix M, whereas a matrix composed of variables e and f is referred to as a transformation matrix T.

[Math 3]

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \quad (8)$$

In the present embodiment, for the sake of simplicity, similarity transformations for transforming the coordinates of the feature points Q1, Q2 into the coordinates of the feature points S1, S2 are derived. In this case, the above expression (8) is rewritten as the following expression (9).

[Math 4]

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \quad (9)$$

Here, the variables a, b, e, and f are expressed by expressions (10) to (13) using x'$_1$, y'$_1$, x$_1$, y$_1$, x'$_2$, y'$_2$, x$_2$, and y$_2$.

[Math 5]

$$a = \frac{(x_1 - x_2)(x'_1 - x'_2) + (y_1 - y_2)(y'_1 - y'_2)}{(x_1 - x_2)^2 + (y_1 - y_2)^2} \quad (10)$$

$$b = \frac{(x_1 - x_2)(y'_1 - y'_2) + (y_1 - y_2)(x'_1 - x'_2)}{(x_1 - x_2)^2 + (y_1 - y_2)^2} \quad (11)$$

$$e = \frac{(y'_1 - y'_2)(x_1 y_2 - x_2 y_1) - (x'_1 + x'_2)(x_1 x_2 + y_1 y_2) + x'_1(x_2^2 + y_2^2) + x'_2(x_1^2 + y_1^2)}{(x_1 - x_2)^2 + (y_1 - y_2)^2} \quad (12)$$

$$f = \frac{(x'_1 - x'_2)(y_1 x_2 - y_2 x_1) - (y'_1 + y'_2)(y_1 y_2 + x_1 x_2) + y'_1(y_2^2 + x_2^2) + y'_2(y_1^2 + x_1^2)}{(x_1 - x_2)^2 + (y_1 - y_2)^2} \quad (13)$$

In step S608, the similarity calculation unit 204 initializes a variable k indicating a feature points pair. The similarity calculation unit 204 initializes the variable k so as to indicate a feature points pair that is included among feature points pairs which were not selected in step S606 and that is at the top of the list of feature points pairs. In the present embodiment, k is initialized to 3 as the feature points pairs with k=1 and k=2 have been selected in the first iterative process. In the second iterative process onward, the feature points pair with k=1 has not been selected in this example, and therefore k is initialized to 1.

In step S609, the similarity calculation unit 204 determines whether voting processes of steps S610 to S615 have been executed for all of the feature points pairs, that is to say, whether the variable k exceeds the total number m of feature points pairs. If the variable k exceeds the total number m, processing proceeds to step S616. If the variable k does not exceed the total number m, processing proceeds to step S610.

In step S610, the similarity calculation unit 204 extracts a feature points pair composed of Qk(x'$_k$, y'$_k$) and Sk(x$_k$, y$_k$) from the list of feature points pairs. As the variable k is set to indicate a feature points pair that was not selected in step S606, the feature points pair extracted in step S610 is other than the feature points pair composed of Q1 and S1 and the feature points pair composed of Q2 and S2 selected in step S606. In step S611, the similarity calculation unit 204 obtains the coordinates S'k(x'$_k$, y'$_k$) by transforming the coordinates Sk(x$_k$, y$_k$) in accordance with expression (9). The coordinates S'k(x'$_k$, y'$_k$) are obtained by transforming the coordinates (x$_k$, y$_k$) of the feature point Sk in accordance with the similarity transformations derived in step S607.

In step S612, the similarity calculation unit 204 calculates an error D(S'$_k$, Q$_k$) between the coordinates S'k(x'$_k$, y'$_k$) and the coordinates Qk(x'$_k$, y'$_k$). In the present embodiment, the similarity calculation unit 204 calculates a geometric distance, e.g., a Euclidean distance between the coordinates S'k(x'$_k$, y'$_k$) and the coordinates Qk(x'$_k$, y'$_k$), and uses the calculated distance as the error between the two sets of coordinates. The error thus calculated indicates the transformation accuracy of the functions that were derived in step S607 for transforming the coordinates Sk in a comparison target image into the coordinates in the comparison source image. It can be said that the smaller the error, the higher the transformation accuracy of the functions. Then, the similarity calculation unit 204 determines whether the calculated error $D(S'_k, Q_k)$ is small, e.g., whether it is equal to or smaller than a threshold Td. If the error $D(S'_k, Q_k)$ is equal to or smaller than the threshold Td, processing proceeds to step S613. If the error $D(S'_k, Q_k)$ exceeds the threshold Td, processing proceeds to step S615.

In step S613, the similarity calculation unit 204 records the pair of the coordinates $Qk(x'_k, y'_k)$ and the coordinates $Sk(x_k, y_k)$ extracted in step S610 into a list of feature points pairs that have achieved highly accurate transformations. It should be noted that the coordinates $S'k(x'_k, y'_k)$ may be recorded. This information can be utilized in obtaining a partial matching region in the comparison source image and the comparison target image. In step S614, the similarity calculation unit 204 increments the number of votes Vote, e.g., adds 1 to the number of votes Vote. This number of votes Vote indicates the number of feature points pairs that have achieved highly accurate coordinate transformations using the similarity transformations derived in step S607. That is to say, the larger the number of votes Vote, the higher the transformation accuracy of the transformation matrix derived in step S607.

In step S615, the similarity calculation unit 204 increments the variable k. Here, the similarity calculation unit 204 increments the variable k so as to indicate a feature points pair that was not selected in step S606. For example, in the second iterative process onward, feature points pairs with k=2 and k=3 are selected, and therefore k is set to 4 after being set to 1. By repeating the above-described steps S609 to S615, the transformation accuracy of the functions derived in S607 is determined using each one of the feature points pairs that were not selected in step S606.

In step S616, the similarity calculation unit 204 compares the value of the number of votes Vote with the value of the final number of votes VoteMax. If the value of the number of votes Vote is larger than the value of the final number of votes VoteMax, processing proceeds to step S617. If the value of the number of votes Vote is equal to or smaller than the value of the final number of votes VoteMax, processing proceeds to step S618. In step S617, the similarity calculation unit 204 replaces the value of the final number of votes VoteMax with the value of the number of votes Vote. In step S618, the similarity calculation unit 204 increments the number of iterations Count, e.g., adds 1 to the number of iterations Count. Thereafter, processing returns to step S604.

In the flowchart of FIGS. 6A and 6B, the number of times the processes of steps S605 to S618 are repeated is the same as the maximum number of iterations Rn. That is to say, Rn transformation matrices are derived in step S607, and the transformation accuracy is determined for each one of the transformation matrices. In steps S616 and S617, among the derived transformation matrices, a transformation matrix having the highest transformation accuracy is determined, and a similarity between the comparison source image and the comparison target image is determined in accordance with the value of the number of votes Vote associated with the determined transformation matrix.

In another embodiment, the iterative processes may be ended if the number of votes Vote exceeds a predetermined threshold. For example, if the final number of votes VoteMax exceeds a predetermined threshold in step S604, processing may proceed to step S619. This configuration is advantageous, for example, in a case where an image similar to the comparison source image is searched for from among a plurality of comparison target images. In such an embodiment, the possibility of derivation of transformation matrices with low accuracy is reduced, the number of votes Vote increases, and as a result, an image that earned the number of votes Vote equal to or larger than a threshold, i.e., a comparison target image similar to the comparison source image, can be detected through a fewer number of iterations.

In step S306, the result output unit 205 outputs the value of VoteMax received from the similarity calculation unit 204, which indicates the similarity between the comparison source image and the comparison target image. The larger the value of VoteMax, the larger the number of feature amounts pairs whose coordinate values satisfy the similarity transformations, that is to say, the closer the similarity relationship between the images. Therefore, it can be said that the larger the value of VoteMax, the higher the similarity between the comparison source image and the comparison target image.

The result output unit 205 may output the similarity obtained via the output interface 106 to the monitor 110. The result output unit 205 may also output the result obtained via the communication interface 107 to an external device. The result output unit 205 may also store the obtained result into a storage unit, such as the RAM 103 and the external storage apparatus 104, for further processing, e.g., processing for detecting a comparison target image that is most similar to the comparison source image.

In the foregoing description, the similarity transformations are derived using the selected feature points pairs. However, coordinates transformations to be used are not limited to the similarity transformations, and other geometric transformations can be used. In this case, transformation matrices corresponding to the transformations to be derived are calculated in step S607. For example, in a case where affine transformations are used, three associated points pairs are selected in step S606. Then, in step S607, the variables a to f are derived using the three associated points pairs (a total of six points) selected in step S606 in accordance with expression (8) in place of expression (9).

In the present embodiment, transformation matrices are derived using feature points pairs that have a high possibility of being in correct association; this makes it possible to reduce the possibility of derivation of coordinate transformation functions with low accuracy, and to execute image search processing in a stable manner.

[Second Embodiment]

The following describes a second embodiment of the present invention with reference to the drawings. A challenge faced by the first embodiment is that the amount of calculation is large because, in step S602, the distance between vector feature amounts of Vq and Vs is calculated for every combination through the processes shown in FIGS. 9 and 10. Instead, in the present embodiment, local feature amounts in a comparison source image and a comparison target image are quantized in advance, and for each quantized value, the number of local feature amounts belonging thereto is described in advance. Furthermore, in the present embodiment, the number of feature points in the comparison source image that have the same quantized value as that of a feature point Qk is used as Nq(k), whereas the number of feature points in the comparison target image that have the same quantized value as that of the feature point Qk is used as Ns(k).

Figure 11:
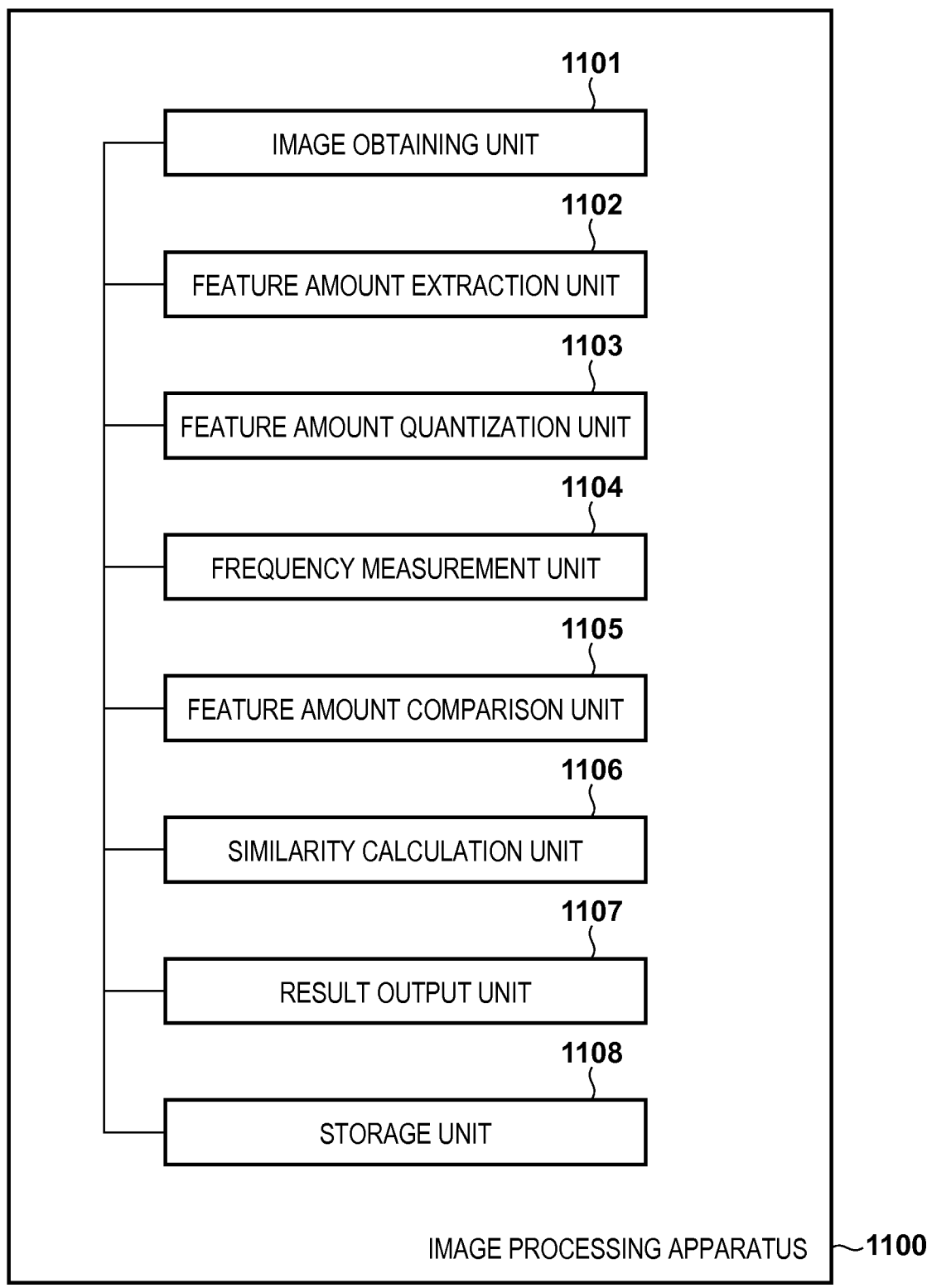
FIG. 11 is a block diagram showing an example of a functional configuration of an image processing apparatus according to a second embodiment.

FIG. 11 is a block diagram showing an example of a functional configuration of an image processing apparatus 1100 according to the second embodiment. An image obtaining unit 1101, a feature amount extraction unit 1102, a feature amount comparison unit 1105, and a similarity calculation unit 1106 are similar to the image obtaining unit 201, the feature amount extraction unit 202, the feature amount comparison unit 203, and the similarity calculation unit 204 according to the first embodiment, respectively. Also, a result output unit 1107 and a storage unit 1108 are similar to the result output unit 205 and the storage unit 206 according to the first embodiment, respectively. These units will be described below only in terms of differences from the first embodiment. A feature amount quantization unit 1103 quantizes each of local feature amounts extracted by the feature amount extraction unit 1102. A frequency measurement unit 1104 measures the appearance frequency of local feature amounts for each quantized value.

Figure 12:
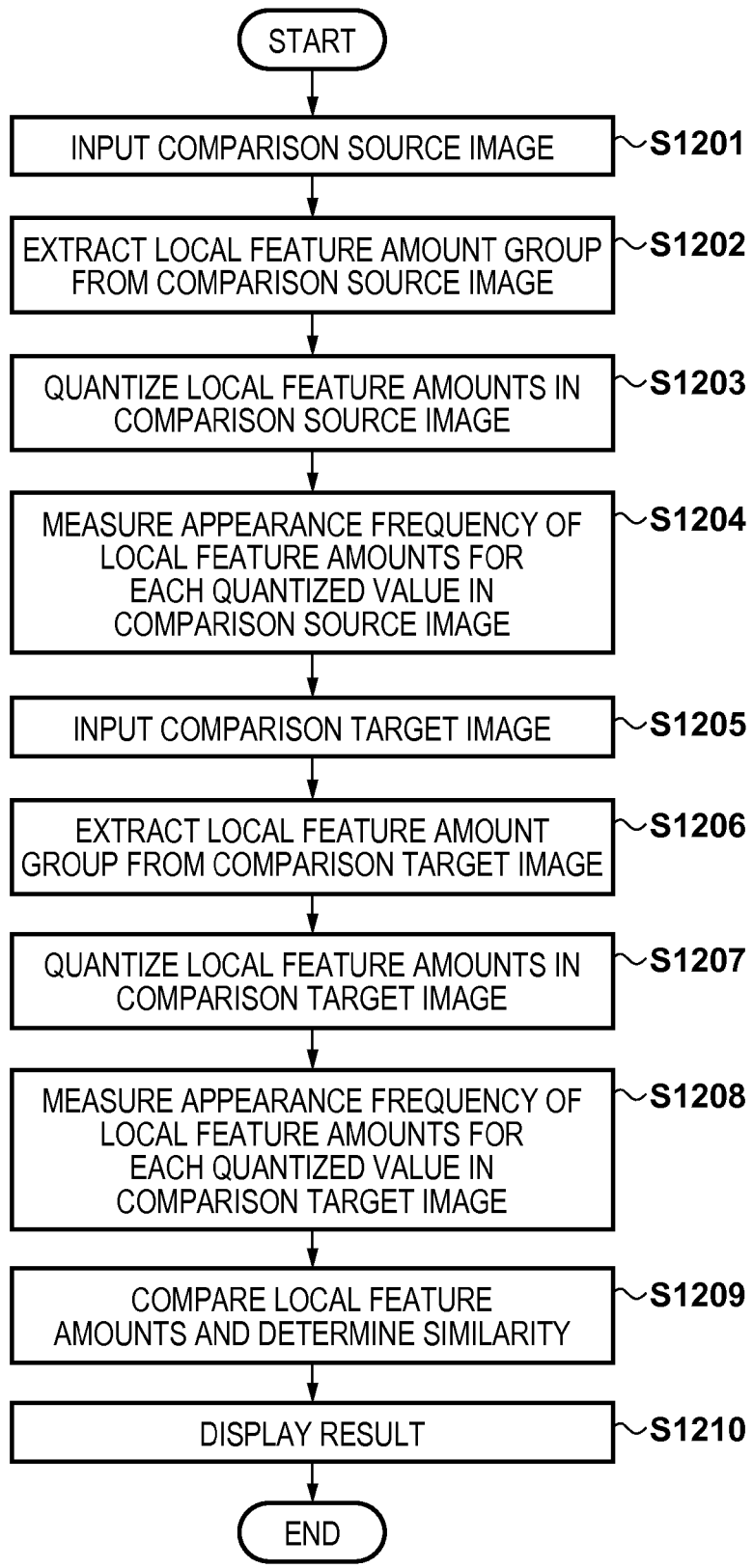
FIG. 12 is a flowchart showing an example of an image processing method according to the second embodiment.

The following describes in more detail the operations of the units included in the image processing apparatus 1100 with reference to a flowchart of FIG. 12 showing an example of processing according to the second embodiment. In step S1201, the image obtaining unit 1101 obtains the comparison source image and stores the same into the storage unit 1108. In step S1202, the feature amount extraction unit 1102 extracts, from the comparison source image, a feature point group and a local feature amount group composed of local feature amounts at feature points, similarly to the first embodiment.

FIG. 14 shows an example schema used in recording a local feature amount. A local feature amount is assigned a unique local feature amount ID as an identifier. Furthermore, the following are recorded as information of a local feature amount: a local feature amount vector, and information of the coordinates of a feature point at which the local feature amount was obtained. In the present embodiment, all of the local feature amounts extracted from the comparison source image are stored in this format.

In step S1203, the feature amount quantization unit 1103 generates a quantized local feature amount group in the comparison source image by quantizing the local feature amount group extracted in step S1202. In the second embodiment, local feature amounts representing N-dimensional vectors, which are calculated from the feature points based on local jets and a combination of derivatives thereof, are used similarly to the first embodiment. Here, a feature amount of the $n^{th}$ dimension among N dimensions is quantized to Kn tones. It is assumed that N and Kn are preset.

Specifically, the feature amount quantization unit 1103 quantizes the local feature amounts in accordance with the following expression (14).

$$Qn=((Vn-Vn\_\min)*Kn)/(Vn\_\max-Vn\_\min+1) \qquad (14)$$

Here, Qn is a value obtained by quantizing a feature amount Vn of the $n^{th}$ dimension among N dimensions. Vn_max and Vn_min respectively denote the largest value and the smallest value that a feature amount of the $n^{th}$ dimension can take.

A quantized local feature amount is composed of quantized values calculated for different dimensions. A quantized local feature amount group includes all of the quantized local feature amounts calculated for local feature amounts composing a local feature amount group.

In the present embodiment, the number of quantized tones is set on a dimension-by-dimension basis. However, the same number of tones may be set for some dimensions, and may be set for all of the dimensions. The quantization method according to expression (14) is equivalent to a method for dividing a feature amount space to form a grid-like pattern as shown in FIG. 13A. FIG. 13A shows quantized regions 1301 forming the grid-like pattern and local feature amounts 1302. No particular limitation is intended regarding a method for dividing a feature amount space. For example, a feature amount space may be divided into the shapes shown in FIG. 13B. Although FIGS. 13A and 13B show division of a two-dimensional feature amount space, an N-dimensional feature amount space is divided in practice.

Also, local feature amounts may be quantized using any division method without using the rule of expression (14), as long as the method can divide a multi-dimensional feature amount space. For example, a clustering rule may be generated by application of machine learning to a plurality of images, and local feature amounts may be clustered in accordance with the generated rule; this is equivalent to division of a multi-dimensional feature amount space.

Furthermore, after performing quantization in each dimension, a quantized value group can be labeled. For example, a quantization label IDX can be calculated in accordance with the following expression (15), and this quantization label IDX can be treated similarly to a one-dimensional feature amount.

$$IDX=Q1+Q2\times K1+Q3\times K1\times K2+\ \ldots\ +Qn\times K1\times K2\times \ldots \times Kn-1 \qquad (15)$$

In a case where the same number of tones is set for all of the dimensions, a quantization label IDX can be calculated in accordance with the following expression (16). Here, K denotes the same number of tones.

[Math 6]

$$IDX = \sum_{n=1}^{N} K^{(n-1)} Qn \qquad (16)$$

It should be noted that a labeling method is not limited to the one described above, and a quantization label can be calculated in accordance with, for example, expressions other than expressions (15) and (16). Furthermore, it is not imperative to perform labeling, and the appearance frequency of multi-dimensional quantized feature amounts may be measured.

Figures 15, 16:
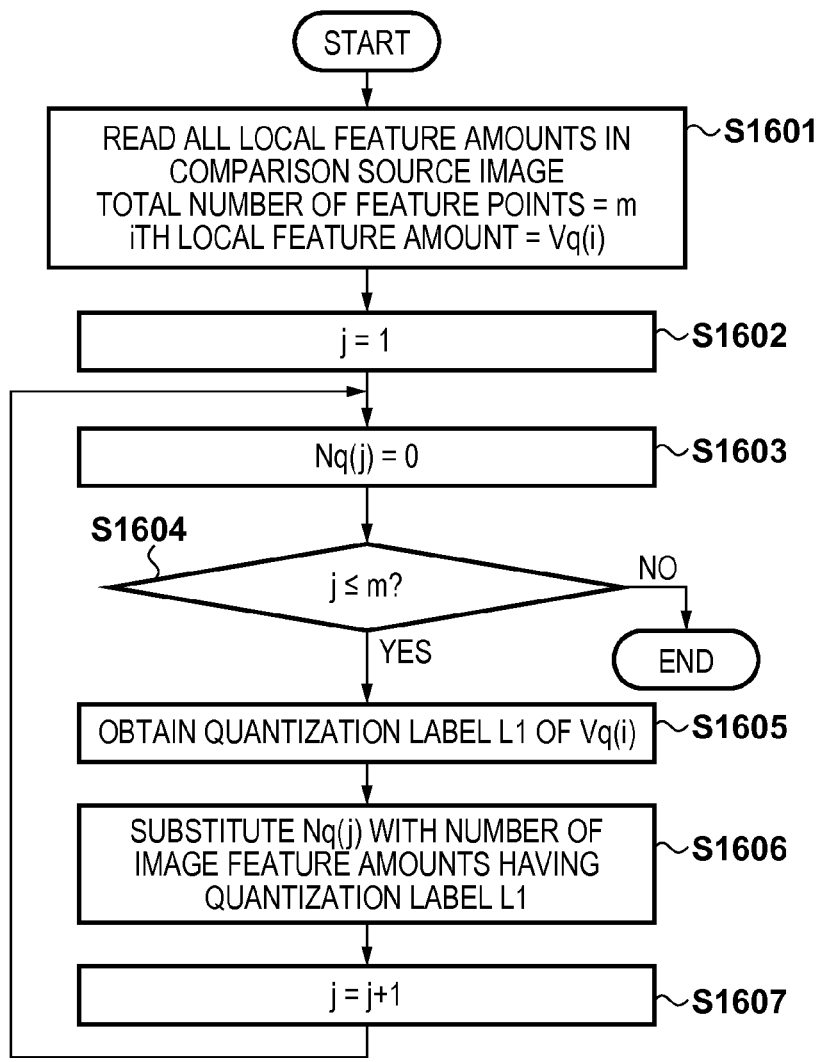
FIG. 15 shows examples of indexed local feature amounts according to the second embodiment.
FIG. 16 is a flowchart showing an example method for calculating Nq(k) according to the second embodiment.

In step S1204, with regard to the quantized local feature amount group generated in step S1203, the frequency measurement unit 1104 measures the appearance frequency of local feature amounts for each quantized value. FIG. 15 shows an example of a table for recording the appearance frequency of local feature amounts generated in step S1204. In the table shown in FIG. 15, each quantization label IDX is recorded together with IDs of local feature amounts having the quantization label IDX. The actual local feature amounts corresponding to the local feature amount IDs can be obtained by referring to the record shown in FIG. 14. In the table shown in FIG. 15, each quantization label IDX is recorded also together with the number of local feature amounts having the quantization label IDX.

In step S1205, the image obtaining unit 1101 obtains the comparison target image and stores the same into the storage unit 1108. In step S1206, the feature amount extraction unit 1102 extracts, from the comparison target image, a feature point group and a local feature amount group composed of local feature amounts at feature points. In step S1207, the feature amount quantization unit 1103 generates a quantized local feature amount group in the comparison target image by quantizing the local feature amount group extracted in step S1206. In the present embodiment, the feature amount quantization unit 1103 quantizes the local feature amounts in the comparison source image and the local feature amounts in the comparison target image using the same method. In step S1208, with regard to the quantized local feature amount group generated in step S1207, the frequency measurement unit 1104 measures the appearance frequency of local feature amounts for each quantized value. The processes of steps S1205 to S1208 are similar to the processes of steps S1201 to S1204 except that they target different images, and therefore a description thereof is omitted.

In step S1209, the feature amount comparison unit 1105 and the similarity calculation unit 1106 determine a similarity between the comparison source image and the comparison target image. Although the process of step S1209 is similar to the process of step S305 in the first embodiment, they differ from each other in the process of step S602 of FIG. 9 showing the detailed process of step S305. Specifically, they differ from each other in a method for detecting a feature point Sk in the comparison target image to be paired with a feature point Qk in the comparison source image, and also in a method for calculating Nq(k) and Sq(k). These methods according to the present embodiment will now be described in detail with reference to FIGS. 16 and 17.

FIG. 16 is a flowchart showing an example of processing according to the present embodiment, for calculating the number Nq(k) of feature points in the comparison source image that have local feature amounts similar to the local feature amount of the feature point Qk. Steps S1601 to S1604 are similar to steps S901 to S904 of FIG. 9, and therefore a description thereof is omitted.

In step S1604, if it is determined that the processes have not been completed for all of the m feature points, processing proceeds to step S1605. In step S1605, the feature amount comparison unit 1105 obtains a quantization label L1 of a local feature amount Vq(j) of a feature point Qj. The quantization label has been calculated in step S1203 in the above-described manner.

In step S1606, the feature amount comparison unit 1105 obtains the number of local feature amounts in the comparison source image that have the quantization label L1. This process can be easily executed by referring to the table shown in FIG. 15 generated in step S1204. It is considered that local feature amounts having the same quantization label are similar to one another. That is to say, the number of local feature amounts having the quantization label L1 can be used as the number of feature points whose local feature amounts are similar to the local feature amount Vq(j) of the feature point Qj. Then, the feature amount comparison unit 1105 substitutes Nq(j) with the obtained number of local feature amounts. The feature amount comparison unit 1105 increments j, i.e., adds 1 to j in step S1607, and then processing returns to step S1603.

Figure 17:
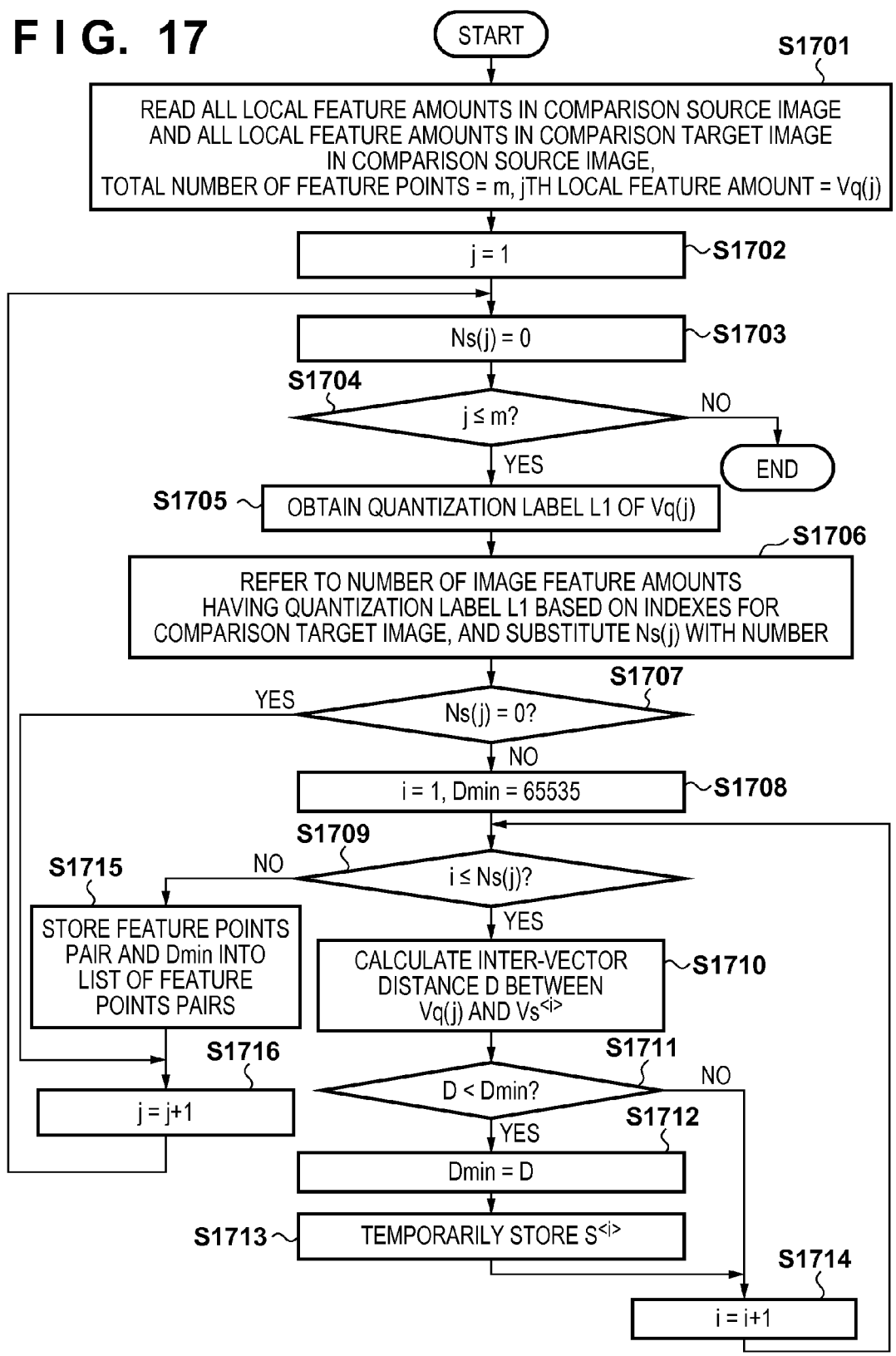
FIG. 17 is a flowchart showing an example method for calculating Ns(k) according to the second embodiment.

FIG. 17 is a flowchart showing an example of processing according to the present embodiment, for detecting the feature point Sk corresponding to the feature point Qk, and for calculating the number Ns(k) of feature points in the comparison target image that have local feature amounts similar to the local feature amount of the feature point Qk. Steps S1701 to S1704 are similar to steps S1001 to S1004 of FIG. 10, and therefore a description thereof is omitted.

In step S1704, if it is determined that the processes have not been completed for all of the m feature points, processing proceeds to step S1705. In step S1705, the feature amount comparison unit 1105 obtains the quantization label L1 of the local feature amount Vq(j) of the feature point Qj. The quantization label has been calculated in step S1203 in the above-described manner.

In step S1706, the feature amount comparison unit 1105 obtains the number of local feature amounts in the comparison target image that have the quantization label L1. This process can be easily executed by referring to the table generated in step S1208. Then, the feature amount comparison unit 1105 substitutes Ns(j) with the obtained number of local feature amounts.

In step S1707, the feature amount comparison unit 1105 determines whether Ns(j) is 0. If Ns(j) is 0, that is to say, if the comparison target image does not include a feature point having a local feature amount similar to the local feature amount of the feature point Qj, processing proceeds to step S1716. The feature amount comparison unit 1105 increments j, i.e., adds 1 to j in step S1716, and then processing returns to step S1703. If Ns(j) is not 0 in step S1707, processing proceeds to step S1708.

In step S1708, the feature amount comparison unit 1105 initializes a counter i to 1, and initializes a variable Dmin to a value that is sufficiently larger than a threshold Tv, e.g., to 65535. Distances D between the local feature amount Vq(j) of the feature point Qj and the local feature amounts in the comparison target image that have the same quantization label as that of Vq(j) are sequentially calculated, and the smallest distance D is tentatively stored as the variable Dmin. In step S1709, the feature amount comparison unit 1105 determines whether the counter i is equal to or smaller than Ns(j). If the counter i exceeds Ns(j), processing proceeds to step S1715. If the counter i does not exceed Ns(j), processing proceeds to step S1710.

In step S1710, the feature amount comparison unit 1105 calculates an inter-vector distance D between Vq(j) and the $i^{th}$ local feature amount $Vs^{<i>}$ that has the quantization label L1 in the comparison target image. The local feature amount ID of the $i^{th}$ local feature amount can be obtained by referring to the table generated in step S1208 and information recorded in step S1206.

In step S1711, the feature amount comparison unit 1105 compares the distance D calculated in step S1710 with the variable Dmin. If the distance D is smaller than the variable Dmin, that is to say, if the distance D is the smallest distance, processing proceeds to step S1712. If the distance D is equal to or larger than the variable Dmin, processing proceeds to step S1714.

In step S1712, the feature amount comparison unit 1105 updates the variable Dmin to the distance D. In step S1713, the feature amount comparison unit 1105 tentatively selects the feature point $S^{<i>}$ having the local feature amount $Vs^{<i>}$. The tentatively selected feature point $S^{<i>}$ has the local feature amount that is most similar to the local feature amount Vq(j) among the compared feature points $S^{<1>}$ to $S^{<i-1>}$. If a feature point that has the local feature amount more similar to the local feature amount Vq(j) is discovered in subsequent processes, the selected feature point is updated.

In step S1714, the feature amount comparison unit 1105 increments the counter i, i.e., adds 1 to the counter i. Thereafter, processing returns to step S1709.

In step S1715, if there is a feature point that was tentatively selected in step S1713, the feature amount comparison unit 1105 registers this feature point as a feature point Sj to be paired with the feature point Qj with the list of feature points pairs. The feature amount comparison unit 1105 also registers a local feature amount Vs(j) at the feature point Sj with the list of feature points pairs. The feature amount comparison unit 1105 further registers a value of the variable Dmin as an inter-vector distance DV(j) between the feature point Qj and the feature point Sj with the list of feature points pairs. Thereafter, processing proceeds to step S1716.

Through the above-described processes, Nq(k) and Ns(k) are obtained. Thereafter, similarly to the first embodiment, the feature amount comparison unit 1105 calculates the evaluation values N(k) of the feature points pairs, and sorts the list of feature points pairs such that the evaluation values N(k) are arranged in ascending order. The processes of step S603 onward are similar to those of the first embodiment, and therefore a description thereof is omitted.

In the first embodiment, the distance between vector feature amounts, i.e., between a local feature amount Vq and a local feature amount Vs is calculated for every combination of feature points. On the other hand, in the present embodiment, local feature amounts are quantized, and local feature amounts belonging to each quantized value are extracted in advance. By referring to such information, a local feature amount Vq or a local feature amount Vs similar to one local feature amount Vq can be easily searched for. As it is sufficient to calculate the distance between vector feature amounts based on the local feature amount Vq or Vs that has been searched for, the amount of calculation can be significantly reduced.

It should be noted that generation of indexes, e.g., quantization labels for local feature amounts in the comparison target image is a standard practice in an image search system, and it is hence considered that the load of calculation of the quantization labels does not create a big problem.

In the present embodiment, local feature amounts in the comparison source image and the comparison target image are quantized in advance. However, it is not imperative to quantize local feature amounts in both of the comparison source image and the comparison target image in advance. For example, in a case where the evaluation values N(k) of feature points pairs are calculated using one of Nq(k) and Ns(k) in the above-described manner, it is sufficient to quantize local feature amounts in one of the comparison source image and the comparison target image. In this way, in one embodiment, quantized feature amounts are calculated by quantizing at least one of local feature amounts of feature points in the comparison source image and local feature amounts of feature points in the comparison target image. Furthermore, similarly to the first embodiment, Nq(k) and Ns(k) may be the number of feature points in the comparison source image and the comparison target image that have the same quantized value as that of the feature point Sk in the comparison target image. In this way, in one embodiment, Nq(k) and Ns(k) indicate the numbers of feature points in the comparison source image and the comparison target image whose feature amounts are the same as the quantized feature amount of a feature point in the comparison source image or the comparison target image that composes a feature points pair. The evaluation value N(k) of a feature points pair is set based on at least one of Nq(k) and Ns(k) thus obtained, in such a manner that the smaller Nq(k) and/or Ns(k), the larger the evaluation value N(k).

In another embodiment, Nq(k) and Ns(k) indicate the numbers of feature points in the comparison source image and the comparison target image whose feature amounts are similar to the quantized feature amount of a feature point in the comparison source image or the comparison target image that composes a feature points pair. For example, Nq(k) and Ns(k) may each be a sum of the following: the number of feature points belonging to a quantized region (or clustering region) to which a feature point composing a feature points pair belongs, and the number of feature points belonging to a quantized region (or clustering region) that neighbors the foregoing quantized region. Neiboring quantized regions (or clustering regions) that neighbor a certain quantized region (or clustering region) may be predefined.

[Third Embodiment]

In the first and second embodiments, feature points pairs that have a high possibility of being in correct association are selected as feature points pairs used to derive transformation matrices through RANSAC processing. In the third embodiment, feature points pairs are selected so as to extend the intra-image distances between feature points. This configuration prevents a situation in which the accuracy of the obtained transformation matrices decreases because the distances between feature points are too small. Processing of the third embodiment is similar to processing of the first and second embodiments, except that the process of step S606 is different. The following describes the difference from the first embodiment.

Figure 18:
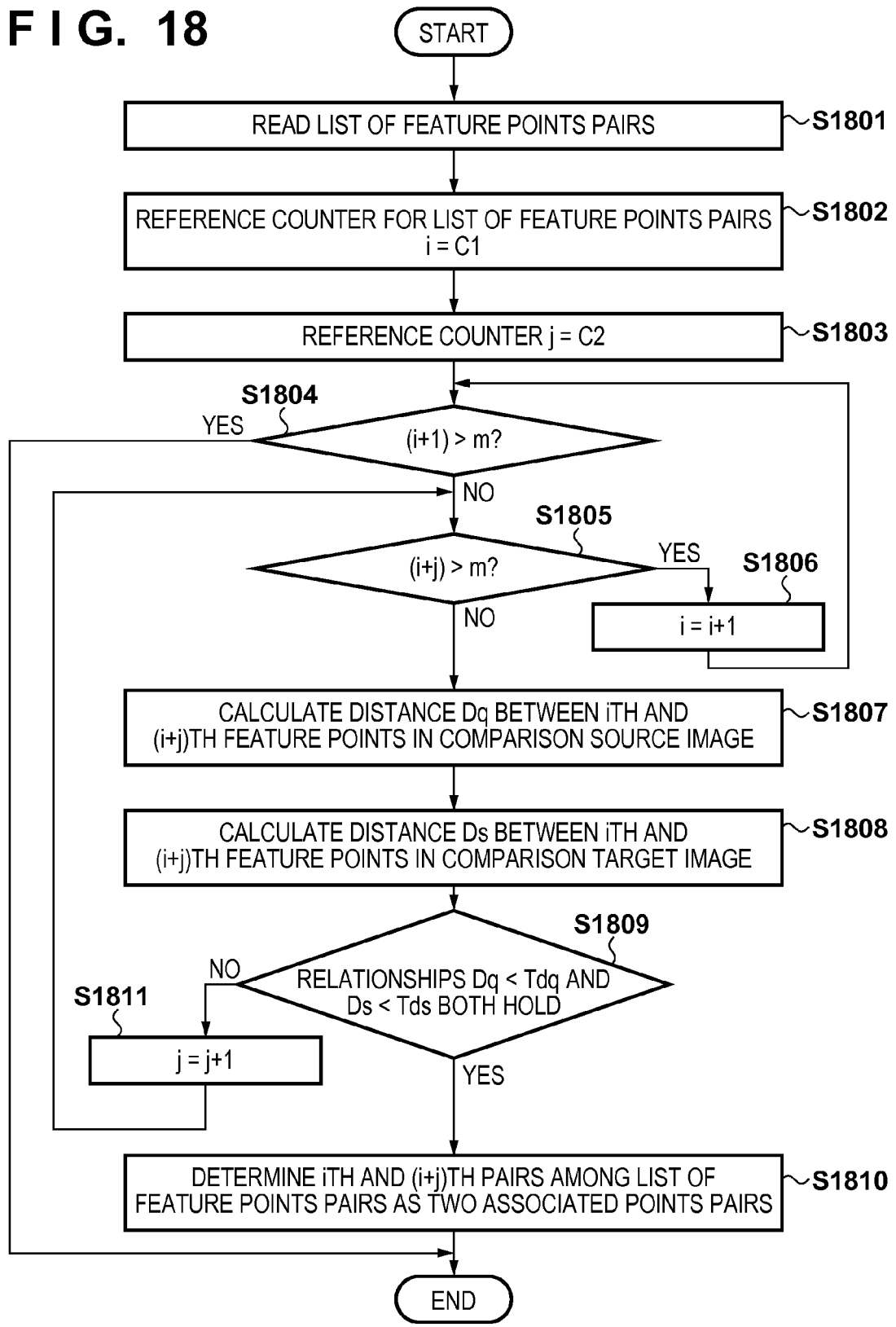
FIG. 18 is a flowchart showing an example method for selecting feature amounts pairs according to a third embodiment.

FIG. 18 is a flowchart showing the process of step S606 in the third embodiment. In step S1801, the similarity calculation unit 204 reads a list of feature points pairs generated in step S602. As described above, the list of feature points pairs is sorted such that the values of N(k) are arranged in ascending order. Also, m feature points pairs are registered with the list of feature points pairs.

In step S1802, the similarity calculation unit 204 sets C1 to a reference counter i for the list of feature points pairs. Next, in step S1803, the similarity calculation unit 204 sets C2 to a reference counter j for the list of feature points pairs. At the time of the start of the flowchart shown in FIGS. 6A and 6B, 1 is set to C1 and C2. In the following processes, the intra-image distances between the $i^{th}$ feature points pair and the $(i+j)^{th}$ feature points pair are determined.

In step S1804, the similarity calculation unit 204 determines whether the relationship (i+1)>m is satisfied, that is to say, whether the determination has been made for every combination of feature points pairs. If the relationship (i+1)>m is satisfied, processing of FIG. 18 is ended. If the relationship (i+1)≤m is satisfied, processing proceeds to step S1805.

In step S1805, the similarity calculation unit 204 determines whether the relationship (i+j)>m is satisfied, that is to say, whether the determination has been made between one feature points pair i and all of the feature points pairs i+1 to m. If the relationship (i+j)>m is satisfied, processing proceeds to step S1806. If the relationship (i+j)≤m is satisfied, processing proceeds to step S1807. In step S1806, the similarity calculation unit 204 increments i, that is to say, adds 1 to i.

In step S1807, the similarity calculation unit 204 calculates the distance Dq between a feature point in the comparison source image composing the $i^{th}$ feature points pair and a feature point in the comparison source image composing the $(i+j)^{th}$ feature points pair. Furthermore, in step S1808, the similarity calculation unit 204 calculates the distance Ds between a feature point in the comparison target image composing the $i^{th}$ feature points pair and a feature point in the comparison target image composing the $(i+j)^{th}$ feature points pair.

In step S1809, the similarity calculation unit 204 determines whether the following condition is satisfied: the relationships Dq>Tdq and Ds>Tds both hold. If this condition is satisfied, processing proceeds to step S1811. If this condition is not satisfied, processing proceeds to step S1810.

Tdq and Tds are thresholds for the distance between sets of coordinates, and when Dq is larger than Tdq, it means that the distance between feature points composing the $i^{th}$ and $(i+j)^{th}$ feature points pairs in the comparison source image is sufficiently large. On the other hand, when Ds is larger than Tds, it means that the distance between feature points composing the $i^{th}$ and $(i+j)^{th}$ feature points pairs in the comparison target image is sufficiently large. In the present embodiment, if this condition is satisfied, it is determined that the intra-image distances between the $i^{th}$ feature points pair and the $(i+j)^{th}$ feature points pair are sufficiently large. In this case, it is considered that there is a low possibility that the accuracy of transformation matrices generated using these feature points pairs decreases due to extreme proximity between these feature points pairs, and therefore these feature points pairs are used to generate the transformation matrices. No particular limitation is intended regarding a method for setting the thresholds Tdq and Tds, and the thresholds Tdq and Tds may have predefined values, for example. The thresholds Tdq and Tds may have the same value.

It should be noted that the determination of whether the distance is larger than a threshold need not be made for both of Dq and Ds. That is to say, in one embodiment, the first and second feature points pairs are selected such that, in at least one of the comparison source image and the comparison target image, the intra-image distance between a feature point composing the first feature points pair and a feature point composing the second feature points pair is larger than a threshold.

The similarity calculation unit 204 increments j, that is to say, adds 1 to j in step S1810, and then processing returns to step S1805.

In step S1811, the similarity calculation unit 204 selects the $i^{th}$ feature points pair and the $(i+j)^{th}$ feature points pair from the list of feature points pairs. Furthermore, the similarity calculation unit 204 sets i to the variable C1, and sets j to the variable C2. This marks the end of the process of step S606. The processes of steps S607 to S618 are executed using the two feature points pairs selected in the above-described manner. When the processes of steps S605 to S618 are repeatedly executed, two feature points pairs are newly selected again in step S606. In this case, the processes are executed using C1=i and C2=j set in step S1811. That is to say, the search for two feature points pairs that have sufficiently large intra-image distances from each other is continued.

In the foregoing description, whether the intra-image distances between two feature points pairs are sufficiently large is determined. However, the method of the present embodiment can be expanded for a case in which three or more feature points pairs are selected. That is to say, a plurality of feature points pairs can be selected based on the intra-image distances between feature points composing a plurality of feature points pairs. No particular limitation is intended regarding a specific method; for example, a plurality of feature points pairs can be selected such that the distances between two arbitrary feature points pairs included among the plurality of feature points pairs are larger than thresholds. Furthermore, a plurality of feature points pairs can be selected such that the distances between at least one combination of feature points pairs included among the plurality of feature points pairs are larger than thresholds.

In the third embodiment, among the extracted feature points pairs, a plurality of feature points pairs that have a high possibility of being in correct association and have sufficiently large intra-image distances therebetween are used to obtain transformation matrices. This makes it possible to reduce the possibility of derivation of coordinate transformation functions with low accuracy, and to execute image search processing in a stable manner.

[Fourth Embodiment]

In the fourth embodiment, a plurality of feature points pairs that satisfy the following condition are selected and used to derive transformation matrices: rotation angle corrections used in calculation of local feature amounts thereof are similar. In step S404, rotation correction is applied to an image such that feature amounts are invariant under image rotation, and such that the maximum density gradient is achieved. Rotation correction can be performed at the time of calculation of feature amounts, even in a case where SIFT and the like are used as local feature amounts. At this time, a rotation correction amount can be stored as one type of local feature amount as indicated by the example schema for a local feature amount shown in FIG. 7A. Incidentally, with regard to a plurality of feature points detected from the same object, it is presumed that the rotation correction amounts used in calculation of local feature amounts have substantially the same value. In view of this, in order to derive transformation matrices through RANSAC processing, the present embodiment selects a plurality of feature points pairs that satisfy the following conditions: they have a high possibility of being in correct association, and the rotation correction amounts used therefore are similar. This configuration is expected to increase the possibility of selection of a plurality of feature points pairs related to the same object, and to increase the accuracy of the derived transformation matrices.

Processing of the fourth embodiment is similar to processing of the first and second embodiments, except that the process of step S606 is different. Furthermore, the following processing of the fourth embodiment can be easily combined with processing of the third embodiment. For example, it is possible to select a set of feature points pairs that satisfy both of a condition related to the distance between feature points and a condition related to rotation correction amounts. The following describes the difference from the first embodiment.

Figure 19:
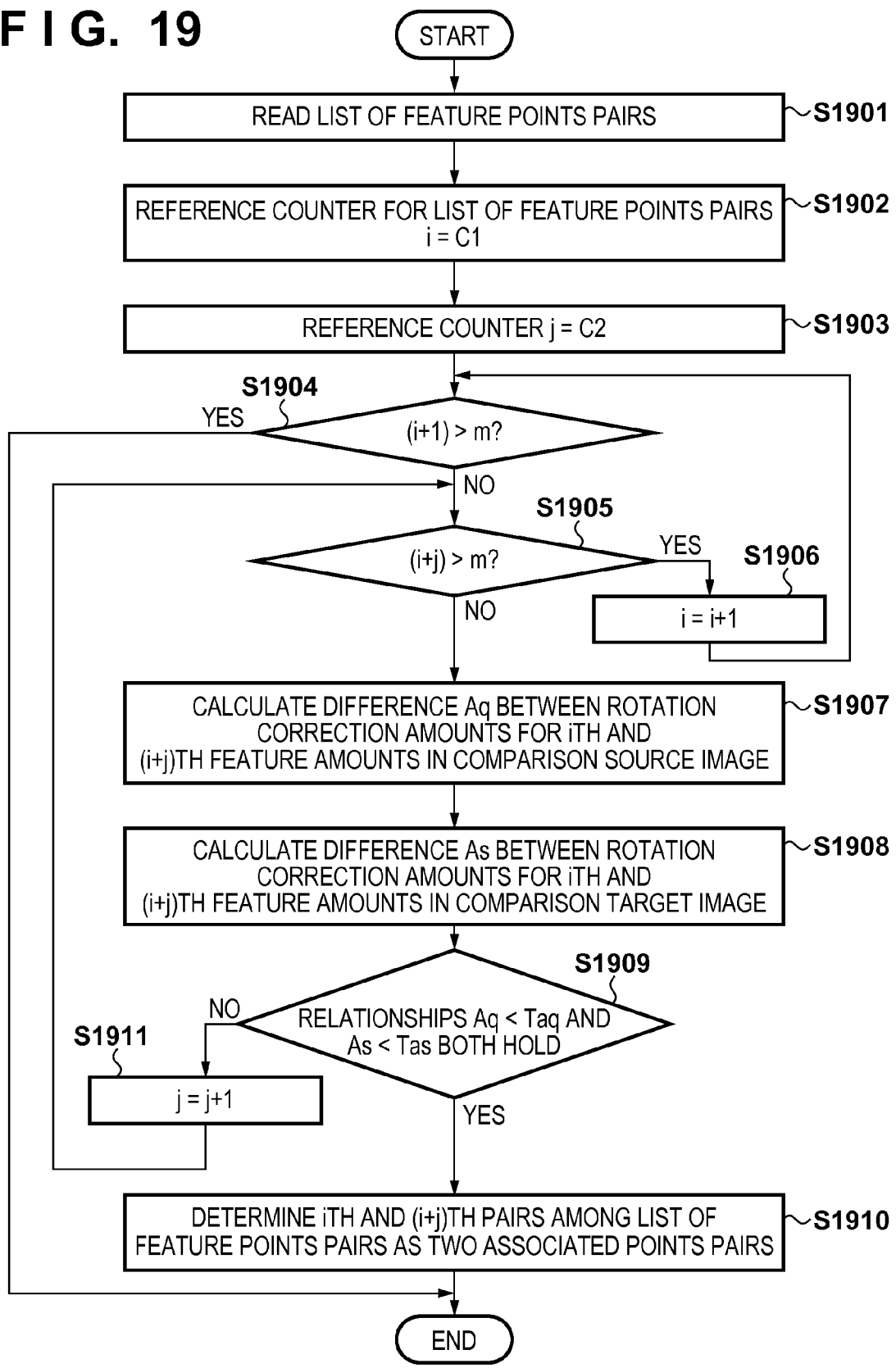
FIG. 19 is a flowchart showing an example method for selecting feature amounts pairs according to a fourth embodiment.

FIG. 19 is a flowchart showing the process of step S606 in the fourth embodiment. The processes of steps S1901 to S1906, S1910, and S1911 are similar to the processes of steps S1801 to S1806, S1810, and S1811 of FIG. 18, and therefore a detailed description thereof is omitted.

In step S1907, the similarity calculation unit 204 calculates the difference Aq between a rotation correction amount recorded for a feature point in the comparison source image composing the $i^{th}$ feature points pair and a rotation correction amount recorded for a feature point in the comparison source image composing the $(i+j)^{th}$ feature points pair. In step S1908, the similarity calculation unit 204 calculates the distance As between a rotation correction amount recorded for a feature point in the comparison target image composing the $i^{th}$ feature points pair and a rotation correction amount recorded for a feature point in the comparison target image composing the $(i+j)^{th}$ feature points pair.

In step S1909, the similarity calculation unit 204 determines whether the following condition is satisfied: the relationships Aq<Taq and As<Tas both hold. If this condition is satisfied, processing proceeds to step S1911. If this condition is not satisfied, processing proceeds to step S1910.

Taq and Tas are thresholds for a rotation correction amount, and when Aq is smaller than Tdq, it means that similar rotation correction amounts were used in calculation of local feature amounts of feature points in the comparison source image composing the $i^{th}$ and $(i+j)^{th}$ feature points pairs. On the other hand, when As is smaller than Tds, it means that similar rotation correction amounts were used in calculation of local feature amounts of feature points in the comparison target image composing the $i^{th}$ and $(i+j)^{th}$ feature points pairs. In the present embodiment, if this condition is satisfied, it is determined that similar rotation correction amounts were used for the $i^{th}$ feature points pair and the $(i+j)^{th}$ feature points pair. In this case, these feature points pairs are used to generate transformation matrices. No particular limitation is intended regarding a method for setting the thresholds Taq and Tas, and the thresholds Taq and Tas may have predefined values. The thresholds Taq and Tas may have the same value. In one embodiment, the thresholds Taq and Tas are five degrees, in which case accuracy can be achieved according to an experiment.

It should be noted that the determination of whether the difference is smaller than a threshold need not be made for both of Aq and As. That is to say, in one embodiment, the difference between a rotation correction amount used to obtain a local feature amount of a feature point composing the first feature points pair and a rotation correction amount used to obtain a local feature amount of a feature point composing the second feature points pair is obtained for at least one of the comparison source image and the comparison target image. The first and second feature points pairs are selected such that the obtained difference is smaller than a threshold.

The processes of steps S607 to S618 are executed using the two feature points pairs selected in accordance with the flowchart of FIG. 19.

In the foregoing description, whether the rotation correction amounts are similar is determined with respect to two feature points pairs. However, the method of the present embodiment can be expanded for a case in which three or more feature points pairs are selected. That is to say, a plurality of feature points pairs can be selected based on the rotation correction amounts used for feature points composing the plurality of feature points pairs. Specifically, a method similar to the method described in the third embodiment can be applied for example.

In the fourth embodiment, among the extracted feature points pairs, a plurality of feature points pairs that satisfy the following conditions are used to obtain transformation matrices: they have a high possibility of being in correct association, and the rotation correction amounts used therefore are similar. This makes it possible to reduce the possibility of derivation of coordinate transformation functions with low accuracy, and to execute image search processing in a stable manner.

[Other Embodiments]

A similarity between the comparison source image and the comparison target image determined in accordance with the first to fourth embodiments can be used to search for an image that is similar to the comparison source image from a plurality of comparison target images. For example, a search unit (not shown) obtains, for each of the plurality of comparison target images, a value of VoteMax indicating a similarity to the comparison source image. The search unit can determine a comparison target image that yielded a larger value of VoteMax as an image similar the comparison source image. In one embodiment, the search unit can determine a comparison target image that yielded the largest value of VoteMax as an image similar to the comparison source image. In another embodiment, the search unit can determine a comparison target image that yielded a value of VoteMax equal to or larger than a threshold as an image similar to the comparison source image. In this case, the search unit may sort the comparison target images in accordance with the values of VoteMax.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135165, filed Jun. 30, 2014, which is hereby incorporated by reference herein in its entirety.

What is claimed is:

1. An image processing apparatus, comprising:
a processor; and
a memory storing instructions that, when executed by the processor, cause the image processing apparatus to:
obtain a plurality of pairs of a feature point in the first image and a feature point in the second image, wherein the pair of feature points are selected such that local feature amounts of the images at the feature points are similar;
count at least one of the number of feature points in the first image where local feature amounts are similar to a local feature amount at one of the pair or the number of feature points in the second image where local feature amounts are similar to a local feature amount at one of the pair and set an evaluation for each of the pairs based on the counted number of feature points such that the smaller the counted number of feature points, the higher the evaluation; and
determine a similarity between the first image and the second image using a random sample consensus (RANSAC) method, wherein a selected pair having a high evaluation is used with priority and an unselected pair is excluded in derivation of a function for transforming coordinates of a feature point in the second image into coordinates of a corresponding feature point in the first image, and the unselected pair is used in evaluation of the function using the RANSAC method, the selected pair and the unselected pair being included in the plurality of pairs.

2. An image processing apparatus, comprising:
a processor; and
a memory storing instructions that, when executed by the processor, cause the image processing apparatus to:
obtain, a plurality of pairs of a feature point in the first image and a feature point in the second image, wherein the pair of feature points are selected such that local feature amounts of the images at the feature points are similar;
count at least one of the number of feature points in the first image where local feature amounts are similar to a local feature amount at one of the pair or the number of feature points in the second image where local feature amounts are similar to a local feature amount at one of the pair, and to set an evaluation for each of the pairs based on the counted number of feature points such that the smaller the counted number of feature points, the higher the evaluation; and
determine a function having the highest transformation accuracy among derived functions by repeating the following processes, and to determine a similarity between the first image and the second image based on the transformation accuracy of the determined function:
selecting a selected pair from the plurality of pairs based on the evaluation, the selected pair and an unselected pair included in the plurality of pairs,
deriving a function for transforming coordinates of a feature point in the second image into coordinates of a corresponding feature point in the first image using a selected pair and not using the unselected pair, and
determining transformation accuracy of the function for transforming the coordinates of the feature point in the second image into the coordinates of the corresponding feature point in the first image using the unselected pair.

3. The image processing apparatus according to claim 1, wherein
an evaluation value of each pair is derived as a product or a sum of the number of feature points in the first image where local feature amounts are close to a local feature amount at one of the pair by a threshold and the number of feature points in the second image where local feature amounts are close to a local feature amount at one of the pair, and the smaller the evaluation value, the higher the evaluation.

4. The image processing apparatus according to claim 1, wherein
an evaluation value of each pair is derived as the number of feature points in the first image where local feature amounts are close to a local feature amount of one of the pair or the number of feature points in the second image where local feature amounts are close to a local feature amount of one of the pair, and the smaller the evaluation value, the higher the evaluation.

5. The image processing apparatus according to claim 1, wherein
the memory further stores instructions that, when executed by the processor, cause the image processing apparatus to repeat the derivation of the function by first deriving a first function using a first set including two or more pairs and then secondly deriving a second function using a second set including two or more pairs, and
an evaluation of at least one pair included in the first set is higher than an evaluation of at least one pair included in the second set.

6. The image processing apparatus according to claim 1, wherein
the memory further stores instructions that, when executed by the processor, cause the image processing apparatus to, when repeating the derivation of the function, select a first set including two or more pairs first, and then select a second set including two or more pairs, and
the highest one of evaluations of the pairs included in the first set is equal to or higher than the highest one of evaluations of the pairs included in the second set.

7. The image processing apparatus according to claim 1, wherein
the memory further stores instructions that, when executed by the processor, cause the image processing apparatus to:
obtain the first image and the second image,
extract a plurality of feature points from the first image and calculate local feature amounts at the feature points,
extract a plurality of feature points from the second image and calculate local feature amounts at the feature points, and
select feature points in the second image to be paired with the feature points in the first images in one-to-one correspondence, such that a local feature amount at the feature point in the second image is closest to a local feature amount at the feature point in the first image among local feature amounts at the feature points extracted in the second image and the local feature amount at the feature point in the second image is close to the local feature amount at the feature point in the first image within a threshold.

8. The image processing apparatus according to claim 1, wherein the memory further stores instructions that, when executed by the processor, cause the image processing apparatus to:
generate a quantized feature amount by quantizing at least one of a local feature amount at a feature point in the first image and a local feature amount at a feature point in the second image; and
set the evaluation of each pair based on at least one of the number of feature points in the first image that have the same quantized feature as that of one of the pair or the number of feature points in the second image that have the same quantized feature amount as that of one of the pair, in such a manner that the smaller the number, the higher the evaluation.

9. The image processing apparatus according to claim 1, wherein the memory further stores instructions that, when executed by the processor, cause the image processing apparatus to:
generate a quantized feature amount by quantizing at least one of a local feature amount at a feature point in the first image and a local feature amount at a feature point in the second image; and
set the evaluation of each pair based on at least one of the number of feature points in the first image that have quantized feature amounts similar to a quantized feature amount of one of the pair or the number of feature points in the second image that have quantized feature amounts similar to the quantized feature amount of one of the pair, in such a manner that the smaller the number, the higher the evaluation.

10. The image processing apparatus according to claim 8, wherein the memory further stores instructions that, when executed by the processor, cause the image processing apparatus to quantize a local feature amount by dividing a feature amount space based on a rule, or by dividing a plurality of local feature amounts by clustering.

11. The image processing apparatus according to claim 1, wherein the memory further stores instructions that, when executed by the processor, cause the image processing apparatus to set the evaluation of each pair based on at least one of the number of feature points in the first image where local feature amounts are similar to a local feature amount at one of the pair or the number of feature points in the second image where local feature amounts are similar to a local feature amount at one of the pair, and on a difference between local feature amounts of the feature points composing the pair, in such a manner that the smaller the number and the difference, the higher the evaluation.

12. The image processing apparatus according to claim 1, wherein the memory further stores instructions that, when executed by the processor, cause the image processing apparatus to, when selecting two or more pairs from among the plurality of pairs based on the evaluation, select the two or more pairs such that an intra-image distance between a feature point composing a first pair and a feature point composing a second pair is larger than a threshold.

13. The image processing apparatus according to claim 1, wherein
the local feature amounts are calculated after applying image rotation correction so as to achieve a maximum density gradient, and
the memory further stores instructions that, when executed by the processor, cause the image processing apparatus to, when selecting two or more pairs from among the plurality of pairs based on the evaluation, select the two or more pairs such that a difference between a rotation correction amount used in obtaining a local feature amount at a feature point composing a first pair and a rotation correction amount used in obtaining a local feature amount at a feature point composing a second pair is smaller than a threshold.

14. The image processing apparatus according to claim 1, wherein the memory further stores instructions that, when executed by the processor, cause the image processing apparatus to search for a second image with a higher similarity by referring to similarities evaluated for a plurality of second images.

15. An image processing method comprising:
obtaining a plurality of pairs of a feature point in the first image and a feature point in the second image, wherein the pair of feature points are selected such that local feature amounts of the images at the feature points are similar;
counting at least one of the number of feature points in the first image where local feature amounts are similar to a local feature amount at one of the pair or the number of feature points in the second image where local feature amounts are similar to a local feature amount at one of the pair and setting an evaluation for each of the pairs based on the counted number of feature points such that the smaller the counted number of feature points, the higher the evaluation; and
determining a similarity between the first image and the second image using a random sample consensus (RANSAC) method, wherein a selected pair having a high evaluation is used with priority and an unselected pair is excluded in derivation of a function for transforming coordinates of a feature point in the second image into coordinates of a corresponding feature point in the first image, and the unselected pair is used in evaluation of the function using the RANSAC method, the selected pair and the unselected pair being included in the plurality of pairs.

16. An image processing method comprising:
obtaining, a plurality of pairs of a feature point in the first image and a feature point in the second image, wherein the pair of feature points are selected such that local feature amounts of the images at the feature points are similar;
counting at least one of the number of feature points in the first image where local feature amounts are similar to a local feature amount at one of the pair or the number of feature points in the second image where local feature amounts are similar to a local feature amount at one of the pair, and setting an evaluation for each of the pairs based on the counted number of feature points such that the smaller the counted number of feature points, the higher the evaluation; and
determining a function having the highest transformation accuracy among derived functions by repeating the following processes, and determining a similarity between the first image and the second image based on the transformation accuracy of the determined function:
selecting a selected pair from the plurality of pairs based on the evaluation, the selected pair and an unselected pair included in the plurality of pairs,
deriving a function for transforming coordinates of a feature point in the second image into coordinates of a corresponding feature point in the first image using a selected pair and not using the unselected pair, and
determining transformation accuracy of the function for transforming the coordinates of the feature point in the second image into the coordinates of the corresponding feature point in the first image using the unselected pair.

17. A non-transitory computer-readable medium storing a program thereon for causing a computer to:
obtain a plurality of pairs of a feature point in the first image and a feature point in the second image, wherein the pair of feature points are selected such that local feature amounts of the images at the feature points are similar;
count at least one of the number of feature points in the first image where local feature amounts are similar to a local feature amount at one of the pair or the number of feature points in the second image where local feature amounts are similar to a local feature amount at one of the pair, and set an evaluation for each of the pairs based on the counted number of feature points such that the smaller the counted number of feature points, the higher the evaluation; and
determine a similarity between the first image and the second image using a random sample consensus (RANSAC) method, wherein a selected pair having a high evaluation is used with priority, an unselected pair is excluded in derivation of a function for transforming coordinates of a feature point in the second image into coordinates of a corresponding feature point in the first image, and the unselected pair is used in evaluation of the function using the RANSAC method, the selected pair and the unselected pair being included in the plurality of pairs.

18. A non-transitory computer-readable medium storing a program thereon for causing a computer to:
  obtain, a plurality of pairs of a feature point in the first image and a feature point in the second image, wherein the pair of feature points are selected such that local feature amounts of the images at the feature points are similar;
  count at least one of the number of feature points in the first image where local feature amounts are similar to a local feature amount at one of the pair or the number of feature points in the second image where local feature amounts are similar to a local feature amount at one of the pair, and set an evaluation for each of the pairs based on the counted number of feature points such that the smaller the counted number of feature points, the higher the evaluation; and
  determine a function having the highest transformation accuracy among derived functions by repeating the following processes, and determine a similarity between the first image and the second image based on the transformation accuracy of the determined function:
    selecting a selected pair from the plurality of pairs based on the evaluation, the selected pair and an unselected pair included in the plurality of pairs,
    deriving a function for transforming coordinates of a feature point in the second image into coordinates of a corresponding feature point in the first image using a selected pair and not using the unselected pair, and
    determining transformation accuracy of the function for transforming the coordinates of the feature point in the second image into the coordinates of the corresponding feature point in the first image using the unselected pair.

* * * * *